United States Patent
Yamamoto

(10) Patent No.: US 6,677,944 B1
(45) Date of Patent: Jan. 13, 2004

(54) THREE-DIMENSIONAL IMAGE GENERATING APPARATUS THAT CREATES A THREE-DIMENSIONAL MODEL FROM A TWO-DIMENSIONAL IMAGE BY IMAGE PROCESSING

(75) Inventor: Shinji Yamamoto, Kainan (JP)

(73) Assignee: Shima Seiki Manufacturing Limited, Wakayama (JP)

( * ) Notice: Subject to any disclaimer, the term of this patent is extended or adjusted under 35 U.S.C. 154(b) by 0 days.

(21) Appl. No.: 09/290,581

(22) Filed: Apr. 13, 1999

(30) Foreign Application Priority Data

Apr. 14, 1998 (JP) ............................ 10-103064
Apr. 14, 1998 (JP) ............................ 10-103065

(51) Int. Cl.[7] ............................................. G06T 15/40
(52) U.S. Cl. ...................... 345/422; 345/581; 345/619
(58) Field of Search ................................... 345/419, 420, 345/421, 422, 423, 426, 427, 441, 442, 443, 506, 581, 582, 589, 592, 593, 594, 611, 614, 619, 629, 634, 636, 955; 382/173, 254, 260, 274, 276, 282, 285, 286, 305, 308, 293, 298, 299

(56) References Cited

U.S. PATENT DOCUMENTS

| 5,347,620 | A | * | 9/1994 | Zimmer | 395/129 |
| 5,680,525 | A | | 10/1997 | Sakai et al. | 395/130 |
| 5,742,294 | A | * | 4/1998 | Watanabe et al. | 345/425 |
| 6,213,653 | B1 | * | 4/2001 | Borg et al. | 395/129 |

FOREIGN PATENT DOCUMENTS

| EP | 0 795 837 | | 9/1997 | |
| GB | 0764921 A1 | * | 3/1997 | ........... G06T/15/50 |
| JP | 5-143711 | | 6/1993 | |
| JP | 10-3352 | | 1/1998 | |
| JP | 10-97643 | | 4/1998 | |
| WO | 93/05468 | | 3/1993 | |

OTHER PUBLICATIONS

Eggli, Lynn et al., entitled "Inferring 3D models from freehand sketches and constraints", Computer–Aided Design, vol. 29, No. 2, Feb. 1, 1997, pp. 101–112.

Narasimhamurthi, N., et al., entitled "Shape Determination from Intensity Images—A New Algorithm", IEEE Transactions on Circuits and Systems, vol. 37, No. 10, Oct. 1, 1990, pp. 1248–1257.

Sakai, Ko et al., entitled "A Shape–from–Texture Algorithm Based on Human Visual Psychophysics", Proceedings of the Computer Society Conference on Computer Vision and Pattern Recognition, U.S. Los Alamitos, IEEE Comp. Soc. Press, Jun. 21, 1994, pp. 527–532.

* cited by examiner

*Primary Examiner*—Mano Padmanabhan
(74) *Attorney, Agent, or Firm*—Wenderoth, Lind & Ponack, L.L.P.

(57) ABSTRACT

A three-dimensional model is created without carrying out complicated modeling by incorporating elements of a two-dimensional image into the three-dimensional model. A two-dimensional image inputted to a two-dimensional image input section is stored in a two-dimensional image storing section, while information on a predetermined element of the two-dimensional image is extracted in a processing section in relation to three-dimensional information, and thereafter transformed to three-dimensional information. A three-dimensional modeling data producing section adds the three-dimensional information transformed from the element information to modeling data which expresses a three-dimensional shape which is previously prepared, and thereby creates a three-dimensional model. A rendering section subjects the three-dimensional model thus created to bump mapping, texture mapping or the like, and thereafter, a three-dimensional image is displayed by a display section.

17 Claims, 32 Drawing Sheets

80a    80b    80c    ...    80n

CENTER　　　　OUTER PERIPHERY
RADIUS

CENTER　　　　OUTER PERIPHERY
RADIUS

F I G. 22A
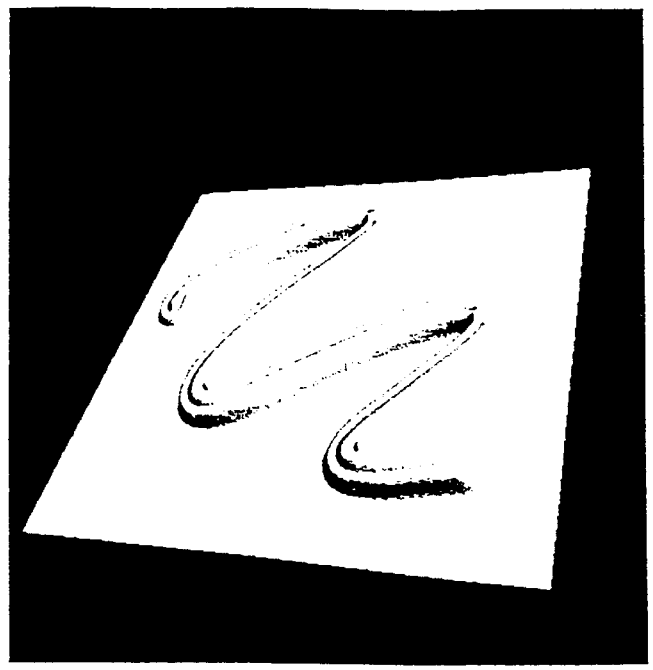
F I G. 22B
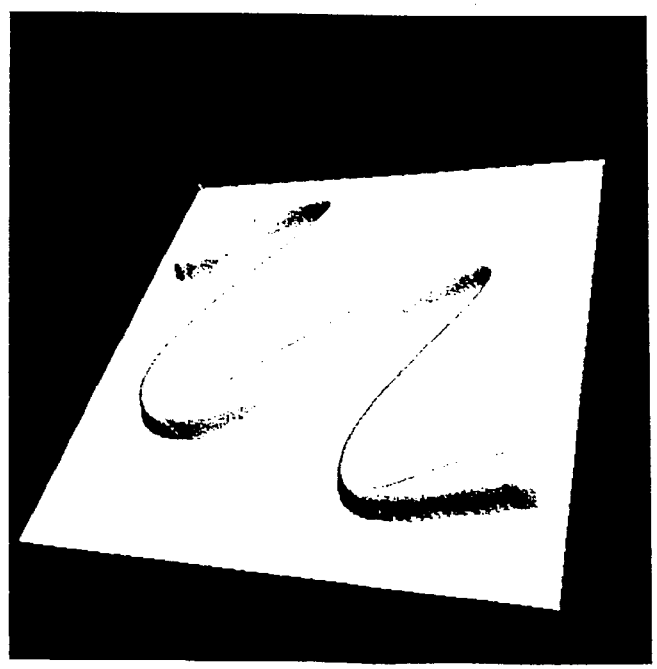

F I G. 23
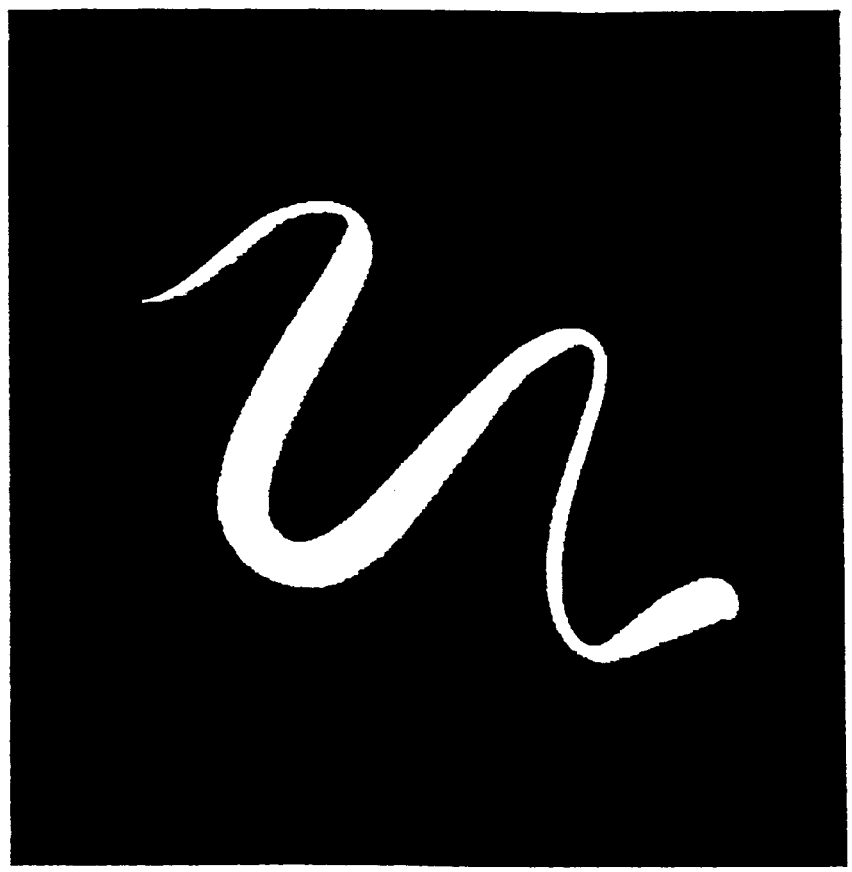

F I G. 25

F I G. 26
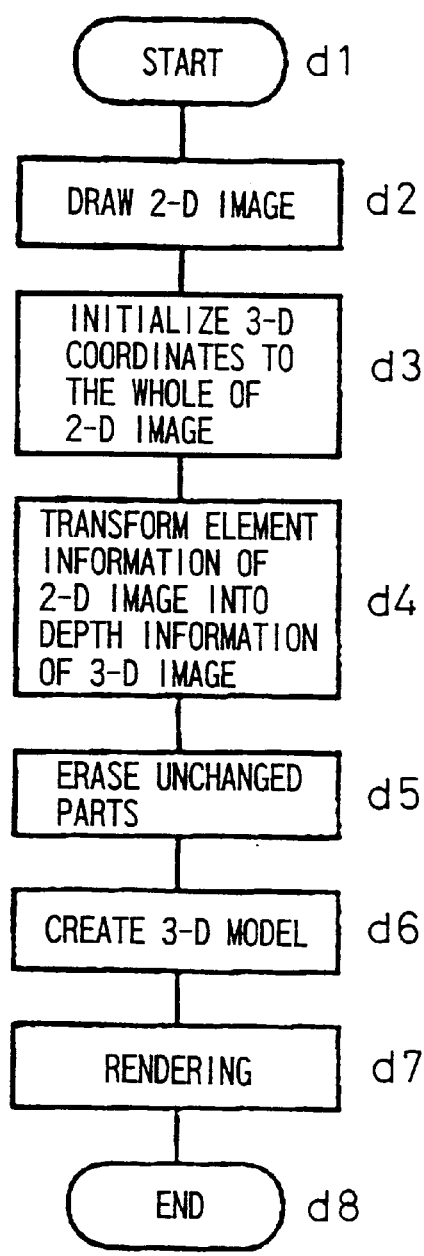

F I G. 27
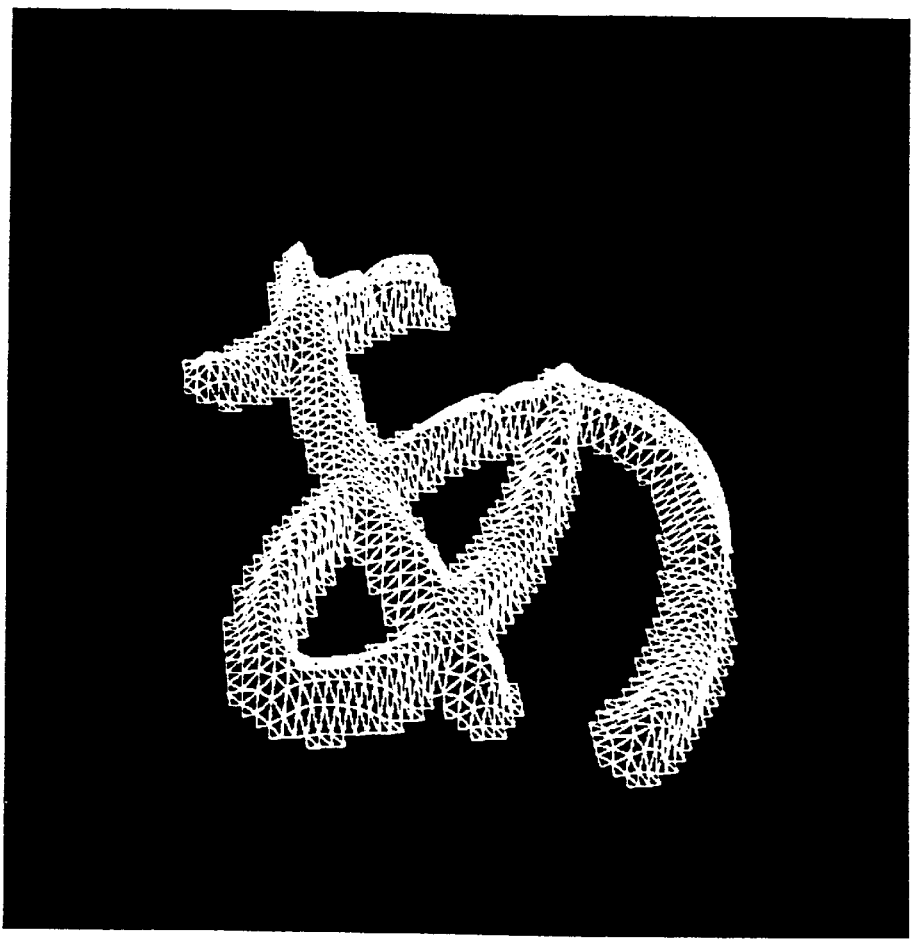

F I G. 29

THREE-DIMENSIONAL IMAGE GENERATING APPARATUS THAT CREATES A THREE-DIMENSIONAL MODEL FROM A TWO-DIMENSIONAL IMAGE BY IMAGE PROCESSING

BACKGROUND OF THE INVENTION

1. Field of the Invention

The present invention relates to a three-dimensional image generating apparatus which creates a three-dimensional model from a two-dimensional image by image processing with a computer to generate a three-dimensional image with computer graphics.

2. Description of the Related Art

Conventionally, a tool called "paint" tool has been widely used as a basic drawing device of computer graphics. The paint tool makes it possible to input a graphic image with a feeling such that a user draws a picture on a display screen with a pen. In a drawing operation using the paint tool, two-dimensional coordinates are continuously specified by means of a pointing device such as a combination of a pen and tablet or a mouse, while coordinate changes accompanying the movement of the pointing device are continuously inputted. For example, in a case where the pointing device is provided with a brush attribution serving as a virtual drawing tool, when the pointing device is moved, drawing processing is carried out on a display with the motion of the pointing device as if a brush is moved.

With the use of the paint tool, it is possible to create an arbitrary image in such a manner that a designer freely draws a picture. In order to make more real an image drawn by computer graphics, it is desired that the image be made into an image which appears as a three-dimensional image. However, in order to draw the image having a three-dimensional appearance, considerably excellent skills, time and labor are required.

In order to solve the above-mentioned problems, there has been developed a computer graphics technique of subjecting a two-dimensional image to image processing so as to make it into a three-dimensional image, and displaying the three-dimensional image thus created. For example, there is a case where characters displayed. as a title of video (pictorial image) software or the like are displayed as a three-dimensional solid image. In order to display the three-dimensional character, a predetermined depth is added to a contour of a two-dimensional character so that the two-dimensional character is three-dimensionally expressed, and thereafter, a three-dimensional image is displayed by rendering. The depth may be nonuniform, for example, a contour portion of the character may be formed thinner than other portions of the character.

In a general technique of creating a three-dimensional model having a complicated shape, a surface of an object is divided into many polygons, for example, many triangles, and a final three-dimensional shape is determined according to a wire frame model which expresses a shape with the use of an edge composing of sides of respective triangles, and thus, a three-dimensional image is generated by rendering. In the case of adding a change to the complicated shape of the three-dimensional image, the wire frame model needs to be directly modified.

A technique for a title of video software or the like, which is one of conventional techniques of creating a three-dimensional model from a two-dimensional image, is directed to merely creating a three-dimensional model having a regular shape. Moreover, in order to directly modify a wire frame model to create a three-dimensional model, a considerable amount of special knowledge, time and labor are required.

SUMMARY OF THE INVENTION

An object of the invention is to provide a three-dimensional image generating apparatus capable of generating a three-dimensional image by incorporating elements of a two-dimensional image into elements of a three-dimensional model, and defining the three-dimensional model without carrying out complicated modeling.

Another object of the invention is to provide a three-dimensional image generating apparatus capable of generating three-dimensional images of various shapes on the basis of two-dimensional images drawn with the use of a paint tool.

The invention relates to a three-dimensional image generating apparatus which generates a three-dimensional image by rendering a three-dimensional model generated on the basis of a two-dimensional image. The apparatus comprises two-dimensional image storing means for storing a two-dimensional image, three-dimensional model setting means for setting a basic shape of the three-dimensional model onto which the two-dimensional image is to be reflected, and three-dimensional model generating means for generating the three-dimensional model by deforming the basic shape on the basis of the two-dimensional image stored in the two-dimensional image storing means according to a predetermined correspondence between an element of the two-dimensional image and a three-dimensional deformation of the basic shape of the three-dimensional model.

According to the invention, a three-dimensional image is generated by deforming the basic shape of the three-dimensional model on the basis of the element of the two-dimensional image stored in the two-dimensional image storing means, and subjecting the three-dimensional model which reflects the two-dimensional image to a rendering process.

In the invention, the two-dimensional image storing means stores image data which expresses the two-dimensional image inputted thereto. The three-dimensional model setting means sets modeling data which defines a three-dimensional shape which is a base for three-dimensionalizing the two-dimensional image.

The three-dimensional model generating means includes element extracting means for extracting information regarding a predetermined element from the inputted image data which expresses the two-dimensional image, and element transforming means for transforming the element information extracted by the element extracting means into three-dimensional information having a predetermined relation. The three-dimensional model generating means also includes model creating means for creating the three-dimensional model by incorporating the three-dimensional information transformed by the element transforming means into the modeling data set by the three-dimensional model setting means, and rendering means for rendering the three-dimensional model created by the model creating means into the three-dimensional image.

According to the invention, the two-dimensional image storing means stores the image data which expresses the two-dimensional image inputted thereto. The three-dimensional model setting means sets modeling data for defining a three-dimensional shape which is a base for making the two-dimensional image into three-dimensional. In the three-dimensional model generating means, the element extracting means extracts information on the predetermined element from the image data which expresses the inputted two-dimensional image.

The element transforming means transforms the element information extracted by the element extracting means into three-dimensional information having a predetermined correspondence therewith. The model creating means incorporates the three-dimensional information transformed by the element transforming means into the three-dimensional shape set by the three-dimensional model setting means to create a three-dimensional model. The rendering means subjects the three-dimensional model created by the model creating means to rendering so as to generate the model as a three-dimensional image. The three-dimensional image is generated on the basis of a three-dimensional model which reflects the element information extracted from the two-dimensional image. Therefore, by changing the element information of the two-dimensional image, it is possible to readily deform the generated three-dimensional image.

The three-dimensional model is created on the basis of the modeling data for determining the three-dimensional shape set by the three-dimensional model setting means. Therefore, there is no need of configuring the whole of the three-dimensional model on the basis of the element information extracted from the two-dimensional image, so that it is possible to reduce the required volume of image processing and to perform the image processing at a high speed.

Further, in the invention, the two-dimensional image is a monochrome image having three or more gradations. The element extracting means extracts gradation information as the element information from the image data which expresses the monochrome image, and the element transforming means transforms the gradation information into three-dimensional depth information.

According to the invention, the monochrome image having three or more gradations is inputted as the two-dimensional image, and the gradation information is extracted as the element information to be transformed into the three-dimensional depth information. Therefore, it is possible to transform gradations in a monochrome image into depth information which expresses a three-dimensional concave and convex. Thereby, it is further possible to readily produce shape data such as a wooden model of a wood-block print.

Further, in the invention, the two-dimensional image is a color image having a plurality of color components. The element extracting means extracts density information of a predetermined color component as the element information from image data which expresses the color image, and the element transforming means transforms the density information of the color component into three-dimensional depth information.

According to the invention, the color image having a plurality of color components is inputted as the two-dimensional image, and the density information of a predetermined color component is extracted as element information, and then, is transformed into the three-dimensional depth information. Therefore, it is possible to create a three-dimensional model which reflects a specific color component of the color image.

Further, in the invention, the three-dimensional image generating apparatus further comprises two-dimensional image modifying means which displays the image data which expresses the two-dimensional image stored in the two-dimensional image storing means inputting and allows input of an drawing operation for modifying the displayed image data.

According to the invention, when the image data which expresses the two-dimensional image is modified by the two-dimensional image modifying means, a three-dimensional model which reflects the modified two-dimensional image can be created. Therefore, it is possible to readily confirm the modified result by displaying the three-dimensional image generated by the rendering means, and to modify the two-dimensional image until a desired three-dimensional image is obtained.

Further, in the invention, the element extracting means, the element transforming means, the model creating means and the rendering means process only image data within a predetermined area including a pixel to which the drawing operation for modifying the image data is carried out by the two-dimensional image modifying means.

According to the invention, a modification of the two-dimensional image stored in the two-dimensional image storing means is performed on the image data within a predetermined area including a pixel to which a drawing operation for modifying the image data is carried out. Therefore, only image data within an area concerning the modification will be processed, so that it is possible to shorten a processing time as compared with the case where image processing of the whole image is performed.

Further, in the invention, the three-dimensional image generating apparatus further comprises mapping means for preparing mapping information which expresses a correspondence between a pixel on the three-dimensional image generated by rendering and a pixel on the two-dimensional image represented by the image data stored in the two-dimensional image storing means. In the processes of transforming the element information into the three-dimensional information by the element transforming means, the three-dimensional information is incorporated into the three-dimensional model by the model creating means, and the three-dimensional model is rendered by the rendering means. The three-dimensional image generating apparatus also comprises a rendering memory for storing three-dimensional data produced by the rendering means together with the mapping information prepared by the mapping means, three-dimensional image modifying means for allowing the three-dimensional image data stored in the rendering memory to be displayed and inputting a drawing operation for modifying the displayed data, and reverse mapping means for modifying the image data which expresses the two-dimensional image stored in the two-dimensional image storing means according to the mapping information stored in the rendering memory when the drawing operation is carried out on the three-dimensional image modifying means.

According to the invention, the rendering memory stores the three-dimensional image data generated by the rendering means, and the mapping information representative of a correspondence between each pixel on the three-dimensional image data and a pixel on the two-dimensional image. The image data stored in the rendering memory is modified by the three-dimensional image modifying means, and thereby, the modified content is incorporated into the corresponding two-dimensional image data. Thus, a three-dimensional model which is a rendering target is modified on the basis of the two-dimensional image. Then, even though the modification by the three-dimensional image modifying means is carried out with respect to the three-dimensional image generated by the rendering means, modification is carried out with respect to the image data which expresses the two-dimensional image which is a base for creating a three-dimensional model. Therefore, there is no need for directly modifying the three-dimensional model, and it is possible to carry out a three-dimensional modification by a simple modification on a two-dimensional image. Moreover, the two-dimensional image is modified, and the modified result is incorporated into the three-dimensional image. Therefore, it is possible to carry out modification on the three-dimensional image without mismatches between the modified portions and the periphery thereof.

Further, in the invention, the element extracting means, the element transforming means, the model creating means and the rendering means only process image data within a predetermined area including a pixel to which the drawing operation for modifying the image data is carried out by the three-dimensional image modifying means.

According to the invention, since a modification of the three-dimensional image generated by the rendering means is performed on the image data within a predetermined area including a pixel to which a drawing operation for modifying the image data is carried out. Therefore, only the image data within the area concerning modification will be processed, so that it is possible to shorten a processing time as compared with the case where image processing of the whole image is performed.

Further, in the invention, the three-dimensional image generating apparatus further comprises texture producing means for producing texture image data on the basis of the two-dimensional image from which the element information is extracted by the element extracting means, wherein the model creating means subjects a surface of the three-dimensional model which reflects the three-dimensional information, to texture mapping for the two-dimensional image according to texture coordinate data produced by the texture producing means.

According to the invention, the element information is extracted from the two-dimensional image by the element extracting means, and the extracted element information is incorporated into the three-dimensional model while texture coordinate data based on the two-dimensional image is produced by the texture producing means. Further, the rendering means carries out texture mapping on the basis of the texture coordinate data when the three-dimensional model is generated. Thus, the original two-dimensional image is three-dimensionalized, and it is possible to obtain a three-dimensional model which is partially deformed three-dimensionally.

Further, in the invention, the three-dimensional image generating apparatus further comprises bump storing means for storing bump processing data inputted thereto, wherein the model creating means subjects a surface of the three-dimensional model which reflects the three-dimensional information, to bump processing based on the data stored in the bump storing means.

According to the invention, the bumping data stored in the bump storing means is used for carrying out bumping processing when a three-dimensional model image is generated by the rendering means. Therefore, a deformation of a normal direction is made on the basis of the bumping data, and thereby, it is possible to readily add concave and convex shapes onto the surface of the three-dimensional image.

According to the invention, the information on the element extracted from the two-dimensional image is incorporated when creating the three-dimensional model, and a three-dimensional model having a complicated shape can be readily created. Also according to the invention, the shape serving as a base of the three-dimensional image is set with modeling data. Thereby, it is possible to generate the three-dimensional model which reflects the two-dimensional image.

According to the invention, it is possible to create a three-dimensional model which reflects the gradation of the monochrome image in the three-dimensional depth thereof. It is also possible to readily obtain a three-dimensional model in which a specific color component of the color image is incorporated into the depth information thereof. It is further possible to readily modify the three-dimensional model by modifying the image data of the two-dimensional image which is a base of the three-dimensional model.

According to the invention, a modification which is made to the three-dimensional image generated by rendering modification is incorporated into the original two-dimensional image. Therefore, the modification can be readily incorporated into the shape of the three-dimensional model without mismatches due to the modification. In the case where modification is carried out with respect to the image data, the image data within a predetermined area is modified by image processing, so that three-dimensional image processing can be promptly performed.

According to the invention, on the surface of the three-dimensional image which reflects the element extracted from the two-dimensional image, the two-dimensional image is added by texture mapping. Thereby, it is possible to obtain a three-dimensional image in which a part of the original two-dimensional image is made into concave and convex.

According to the invention, the surface of the three-dimensional image is subjected to bumping, so that the feel of material can be readily expressed.

In the invention, the two-dimensional image storing means has two-dimensional image drawing means provided with a brush tool for drawing the two-dimensional image, and stores a plurality of two-dimensional images including the two-dimensional image drawn by the two-dimensional image drawing means. Also, the three-dimensional model setting means sets a relation between a shape of the three-dimensional model and predetermined element information of the two-dimensional image. Further, the three-dimensional model generating means includes element extracting means for reading out the two-dimensional image stored in the two-dimensional image storing means, and extracting the element information related to the shape of the three-dimensional model from the two-dimensional image, and three-dimensional image processing means for creating the three-dimensional model whose shape reflects the element information of the two-dimensional image extracted by the element extracting means according to the relation set by the three-dimensional model setting means, and generating the three-dimensional image by rendering of the created three-dimensional model.

According to the invention, when the two-dimensional image is drawn by the brush tool included in the two-dimensional image drawing means, the two-dimensional image is stored in the two-dimensional image storing means. The two-dimensional image includes element information having a relation set by the three-dimensional model setting means with respect to the three-dimensional model. Element information is extracted from the two-dimensional image by the element extracting means, and then, is incorporated into a shape of the three-dimensional model by the three-dimensional image processing means so that a three-dimensional model is created, and thereafter, a three-dimensional image is generated by rendering. In other words, when the two-dimensional image is drawn, it is possible to generate a three-dimensional image having various shapes on the basis of the element information of the two-dimensional image.

Further, in the invention, the three-dimensional image generating apparatus further comprises image outputting means for outputting the three-dimensional image generated by the three-dimensional image processing means at a resolution higher than that of the displayed image.

According to the invention, the three-dimensional image generated by the three-dimensional image processing means can be outputted from the image outputting means at a resolution higher than that of a displayed image. Therefore, it is possible to output a three-dimensional image with an image quality as well as a photograph and printed matters.

Further, in the invention, the three-dimensional image generating apparatus further comprises reverse mapping means for generating and storing a correspondence of a pixel on the displayed three-dimensional image to a pixel on the two-dimensional image from which the element is extracted as reverse mapping information, when rendering is performed on the three-dimensional model which reflects the element information of the two-dimensional image by the three-dimensional image processing means. The three-dimensional image generating apparatus also comprises three-dimensional image modifying means for modifying the displayed three-dimensional image in accordance with a drawing operation on the two-dimensional image drawing means, and two-dimensional image modifying means for incorporating the modification made by the three-dimensional image modifying means into the two-dimensional image on the basis of the reverse mapping information stored in the reverse mapping means.

According to the invention, by the reverse mapping means, a correspondence of a pixel on the displayed three-dimensional image and a pixel on the two-dimensional image is generated and stored. Thus, when the three-dimensional image modifying means modifies the displayed three-dimensional image in accordance with a drawing operation made by the two-dimensional image drawing means, the two-dimensional image modifying means can reflect the modified content on the two-dimensional image on the basis of the reverse mapping information. Further, the modification content of the image displayed as the three-dimensional image is handled as an image modified foam the original two-dimensional image which modified image reflects the three-dimensional model element information Therefore, it is possible to modify a three-dimensional image with better reality while reducing mismatches on and in the vicinity of the modified portions.

Further, in the invention, the three-dimensional image generating apparatus further comprises processing area limiting means for controlling so that when the two-dimensional image from which the element extracting means extracts the element information or the displayed three-dimensional image is modified via the drawing operation made on the two-dimensional image drawing means, the processings of extracting the element information by the element extracting means and incorporating the element information into the three-dimensional model by the three-dimensional image processing means are effected in a limited predetermined shape area including a portion to be modified. Since, an area where modification is carried out is limited by the processing area limiting means, it is possible to shorten a response time required for the image modification, reduce a time lag between drawing operation and display, and thus, to promptly perform image processing.

Further, in the invention, the processing area limiting means controls so that the process for incorporation into the three-dimensional model is effected with respect to in the two-dimensional image corresponding to a pixel on the displayed three dimensional image within the predetermined area.

According to the invention, in the area where modification is carried out by being controlled by the processing area limiting means, only a pixel on the two-dimensional image corresponding to a pixel on the three-dimensional image displayed in the predetermined area is incorporated into the three-dimensional model. Therefore, it is possible to further shorten a response time between drawing and display, and to reduce a time lag.

Further, in the invention, the two-dimensional image drawing means, the two-dimensional image storing means, the three dimensional model setting means, the element extracting means and the three-dimensional image processing means are divided into a plurality of processing blocks beforehand, the processing blocks performing pipeline processing.

According to the invention, the processings from drawing of the two-dimensional image by the two-dimensional image drawing means to creation of the three-dimensional image by the three-dimensional image processing means are carried out according to pipeline processing while being divided into a plurality of processing blocks. Therefore, each block processing is effectively performed, and it is possible to promptly perform a three-dimensional image generation with respect to a continuous drawing operation.

Further, in the invention, the two-dimensional image drawing means is provided with a pointing device capable of inputting two-dimensional coordinates and information of pen pressure for operating the brush tool. According to the invention, when the pointing device is operated by the two-dimensional image drawing means, the two-dimensional coordinates and the pen pressure are inputted. Therefore, it is possible to draw the two-dimensional image with a feeling such that a user is drawing with a pen or brush.

Further, in the invention, a shape of the brush tool of the two-dimensional image drawing means is changeable. According to the invention, in the brush tool of the two-dimensional image drawing means, the brush shape is changeable. Therefore, it is possible to flexibly perform different representations with the use of various brushes.

Further, in the invention, the three-dimensional image processing means erases portions where the element information of the two-dimensional image is not incorporated into the shape of the three-dimensional model to be generated while leaving the portions which reflect the two-dimensional image. The three-dimensional image processing means for creating the three-dimensional model erases portions of the shape of the three-dimensional model to be generated which portions do not reflect the element information of the two-dimensional image, while leaving the portions of the shape which reflect the two-dimensional image. Therefore, an advantage that only the element information extracted from the two-dimensional image is displayed with three-dimensional effect.

Further, in the invention, the three-dimensional image processing means incorporates the element information of the two-dimensional image into the shape of the three-dimensional model in both of retracting and protruding directions thereof. The three-dimensional image processing means incorporates element information of the two-dimensional image into the element information on the three-dimensional model in both of the retracting and protruding directions thereof. Therefore, it is possible to three-dimensionally display the element information of the original two-dimensional image with a representation such that a fluid such as a paint is squeezed from a paint tube.

Further, in the invention, the three-dimensional model setting means is provided with three-dimensional coordinates storing means for storing coordinate information which defines the three-dimensional basic shape having a surface on which the two-dimensional image is to be reflected, and a relation between the coordinate information stored in the three-dimensional coordinate storing means and the element information is set. The three-dimensional coordinate storing means stores the coordinate information for defining a shape which is a base of the three-dimensional model. Therefore, it is possible to define a shape of the three-dimensional model independently from the two-dimensional image drawn by the two-dimensional image drawing means, and incorporate the two-dimensional image into various shapes by three-dimensional image processing, and thus, to obtain various three-dimensional images.

The invention provides a recording medium readable by a computer, on which a program for causing the computer to function as a three-dimensional image generating apparatus is recorded, the three-dimensional image generating apparatus subjecting a three-dimensional model generated on the basis of a two-dimensional image to rendering so as to generate a three-dimensional image. The three-dimensional image generating apparatus comprising two-dimensional image storing means for storing the two-dimensional image, three-dimensional model setting means for setting a basic shape of the three-dimensional model on which the two-dimensional image is to be reflected, and three-dimensional model generating means for generating the three-dimensional model by deforming the basic shape on the basis of the two-dimensional image stored in the two-dimensional image storing means according to a predetermined correspondence between an element of the two-dimensional image and a three-dimensional deformation of the basic shape of the three-dimensional model.

According to the invention, it is possible to operate a computer as the three-dimensional image generating apparatus which generates a three-dimensional model in which element information of a two-dimensional drawn image is incorporated into the three-dimensional shape, and performs rendering on the three-dimensional model to generate a three-dimensional image. The two-dimensional image is drawn with the use of the brush tool, and thereby, it is possible to generate a three-dimensional image which reflects the element information of the two-dimensional image. The generated three-dimensional image is arbitrarily modified according to the correspondence between the three-dimensional model and the predetermined element information of the two-dimensional image, so that various representations can be performed. Further, the generated three-dimensional image is displayed, so that the drawing result based on the two-dimensional image can be confirmed.

According to the invention, the generated three-dimensional image is outputted by the image output means at a resolution higher than that of the displayed image, so that a three-dimensional image having a high image quality can be outputted.

According to the invention, when a modification is made on the displayed image by the two-dimensional image drawing means, a corresponding portion of the two-dimensional image whose element is incorporated into the shape of the three-dimensional model is modified on the basis of the reverse mapping information. Therefore, it is possible to make natural image modification on and in the vicinity of the portion in question while looking at the display of the three-dimensional image.

According to the invention, in the case of modifying the image, the modification is carried out within the predetermined area including the portion to be modified, and thereby, it is possible to shorten a time from the drawing operation is made for the modification to the modification result is displayed, and to improve the response.

According to the invention, when a modification is carried out with respect to the displayed image, the modification is carried out with respect to a pixel of the two-dimensional image corresponding to the displayed image. Therefore, even in the case where the two-dimensional and three-dimensional images have a resolution higher than that of the displayed image, the number of pixels to be subjected to the modification is limited, and it is possible to promptly confirm the modification result by displaying the image.

According to the invention, it is possible to shorten a time required for image processing by applying the pipeline operation, and to shorten a time from the drawing operation to the generation of the three-dimensional image which reflects the drawing information.

According to the invention, by the two-dimensional image drawing means, a pen pressure is inputted in addition to the two-dimensional coordinates with the use of the pointing device such as a mouse and a tablet system. It is, therefore, possible to draw a two-dimensional image having gradations with various representations.

According to the invention, in the brush tool of the two-dimensional image drawing means, the brush shape is changeable. Therefore, it is possible to arbitrarily set a diameter of the brush, and to change shape data indicative of a density distribution in the brush. Whereby various and flexibly representations can be performed.

According to the invention, only two-dimensional image drawn by the brush tool is made solid, and thus, a three-dimensional image can be generated. Only a two-dimensional image drawn by the brush tool can generate a three-dimensional image having a shape as being squeezed from a paint tube.

According to the invention, it is possible to define the three-dimensional model independently from the two-dimensional image, and to obtain a three-dimensional image which reflects the element information extracted from the two-dimensional image on the basis of the model.

According to the invention, it is possible to operate the computer system as a three-dimensional image processing apparatus which draws the two-dimensional image by the paint tool, which two-dimensional image is to be reflected on the three-dimensional shape.

BRIEF DESCRIPTION OF THE DRAWINGS

Other and further objects, features, and advantages of the invention will be more explicit from the following detailed description taken with reference to the drawings wherein:

FIGS. 22A and 22B are respectively views showing a three-dimensional image in which gradations of the respective two-dimensional images of FIGS. 21A and 21B are incorporated into depth information;

FIG. 23 is a view showing a three-dimensional image which is created in such a manner that portions of the three-dimensional image of FIGS. 22A and 22B unchanged from basic modeling data are erased therefrom, and gradation information is incorporated in two directions of depth and protrusion;

FIG. 25 is a view showing an example of a three-dimensional image generated based on the two-dimensional image of FIG. 8;

FIG. 26 is a flowchart showing a processing procedure according to another embodiment of the invention;

FIG. 27 is a view showing an example of a three-dimensional model generated at step d6 of the processing procedure of FIG. 26;

FIG. 29 is a view showing a three-dimensional model created by action of element information extracted from the two-dimensional image in both retracting and protruding directions;

DETAILED DESCRIPTION OF THE PREFERRED EMBODIMENTS

Figure 1:
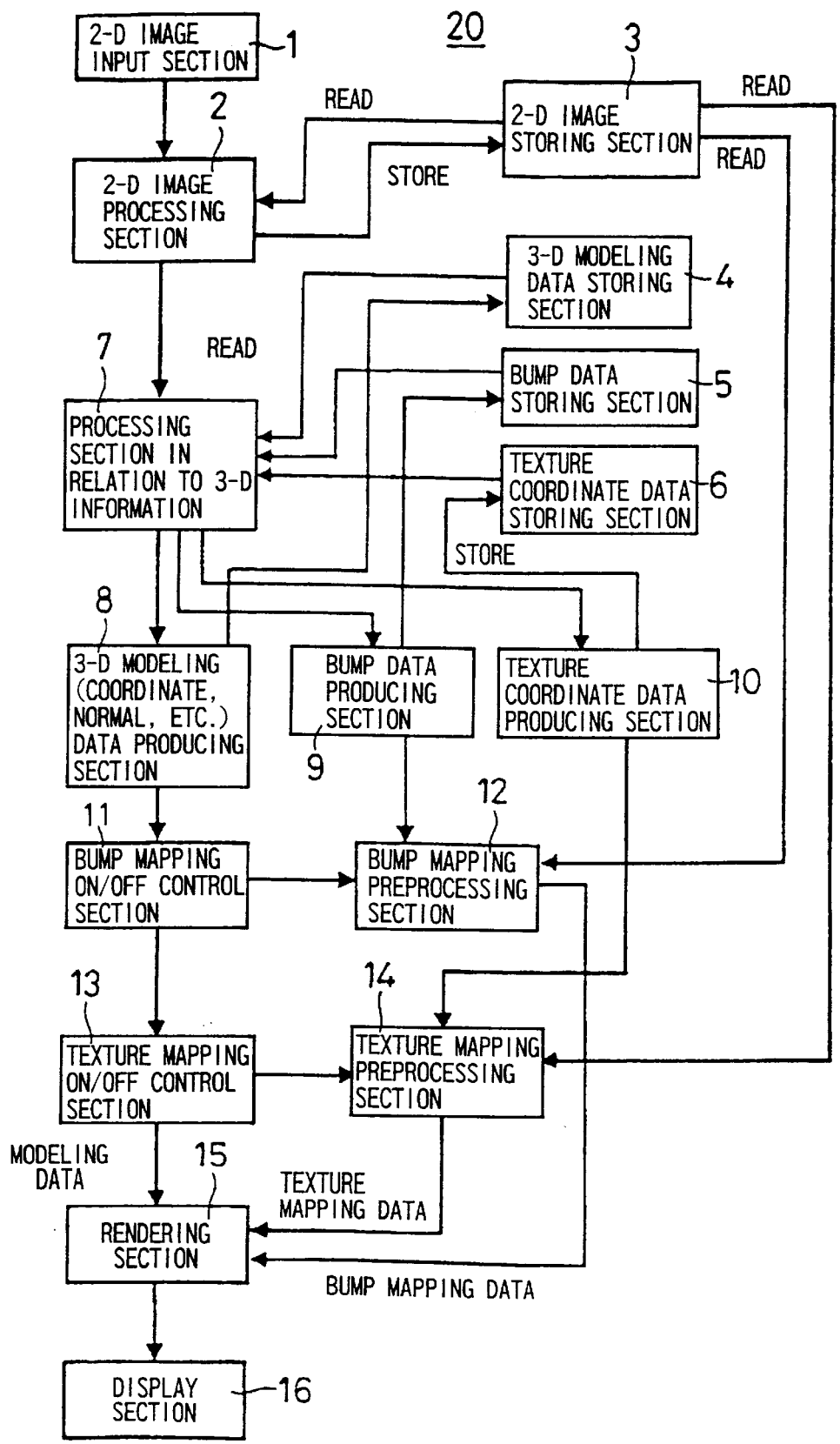
FIG. 1 is a block diagram schematically showing configuration of a three-dimensional model creating apparatus 20 functioning as a three-dimensional image generating apparatus according to a first embodiment of the present invention.

Now referring to the drawings, preferred embodiments of the invention are described below.

FIG. 1 schematically shows an electrical configuration of a three-dimensional image generating apparatus according to a first embodiment of the present invention. A two-dimensional image to be three-dimensionalized is inputted to a two-dimensional image input section 1. A two-dimensional image processing section 2 stores the two-dimensional image inputted to the two-dimensional image input section 1 in a two-dimensional image storing section 3, and then, reads image data which expresses the two-dimensional image stored in the two-dimensional image storing section 3, as the necessity arises. A three-dimensional modeling data storing section 4 stores modeling data for determining a preset three-dimensional shape. As will be described later in FIG. 4, the modeling data has a surface which is a base when three-dimensionalizing the two-dimensional image. A three-dimensional shape of the modeling data is stored in a state of a wire frame model, and then, the shape can be read to deform and modify in a projecting direction. A bump data storing section 5 stores bump data for subjecting to bump processing for adding a fine change in a normal direction to a surface of the three-dimensional model. A texture coordinate data storing section 6 stores texture data, which expresses a color, shading, texture or the like on a surface of an object produced from the input two-dimensional image, as a texture coordinate.

A processing section 7 in relation to three-dimensional information carries out relating processing for relating the two-dimensional image read from the two-dimensional image processing section 2 to the three-dimensional modeling data stored in the three-dimensional modeling data storing section 4. The three-dimensional information based on the two-dimensional image related in the processing section 7 in relation to three-dimensional information is transformed into coordinates, normal components or the like in a three-dimensional modeling data producing section 8, and then, a wire frame model is created. The three-dimensional modeling data produced is stored in the three-dimensional modeling data storing section 4. Also, the processing section 7 in relation to three-dimensional information can carry out relating processing for bump mapping and texture mapping. In this case, the three-dimensional information is supplied to each of a bump data producing section 9 and a texture data producing section 10, and then, bump data and texture coordinate data is produced and stored in the bump data storing section 5 and the texture coordinate data storing section 6, respectively.

A bump mapping control section 11 carries out ON/OFF control of whether or not bump mapping should be carried out with respect to the three-dimensional modeling data produced in the three-dimensional modeling data producing section 8. A control output of the bump mapping control section 11 is supplied to a bump mapping preprocessing section 12, and when bump mapping is in an ON-state, preprocessing is carried out for bump mapping based on the bump data produced by the bump data producing section 9 and the image data which expresses the two-dimensional image stored in the two-dimensional image storing section 3. The modeling data is supplied to a texture mapping control section 13 from the bump mapping control section 11. The texture mapping control section 13 carries out ON/OFF control of whether or not texture mapping should be carried out with respect to a texture mapping preprocessing section 14. When texture mapping is carried out, preprocessing for texture mapping is carried out between the texture coordinate data produced in the texture coordinate data producing section 10 and the image data which expresses the two-dimensional image read from the two-dimensional image storing section 3.

Three-dimensional modeling data is supplied to a rendering section 15 from the texture mapping control section 13, and then, rendering is carried out so that a wire frame model is three-dimensionally visible with the use of bump mapping data and texture mapping data respectively supplied from the bump mapping preprocessing section 12 and the texture mapping preprocessing section 14. The rendering section 15 has a rendering memory which stores the processing result as image data. In the case where the wire frame is displayed as it is, a backside edge when viewed from a viewpoint is also displayed. For this reason, it is difficult to recognize the wire frame as a real three-dimensional shape. The processing result of the rendering section is read from the rendering memory, and then, is displayed as an image on a display section 16 such as a cathode-ray tube (CRT), a liquid crystal display (LCD) or the like.

As described above, in the three-dimensional model creating apparatus 20 functioning as the three-dimensional image generating apparatus according to this embodiment the two-dimensional image inputted to the two-dimensional image input section 1 is incorporated into the three-dimensional modeling data produced in the three-dimensional modeling data producing section 8, and thus, a three-dimensional model can be obtained. Moreover, the two-dimensional image input section 1 may be provided with a two-dimensional image reader such as a scanner, and further, be arranged so as to read a filed two-dimensional image or to directly input the image by a drawing operation.

Figure 2:
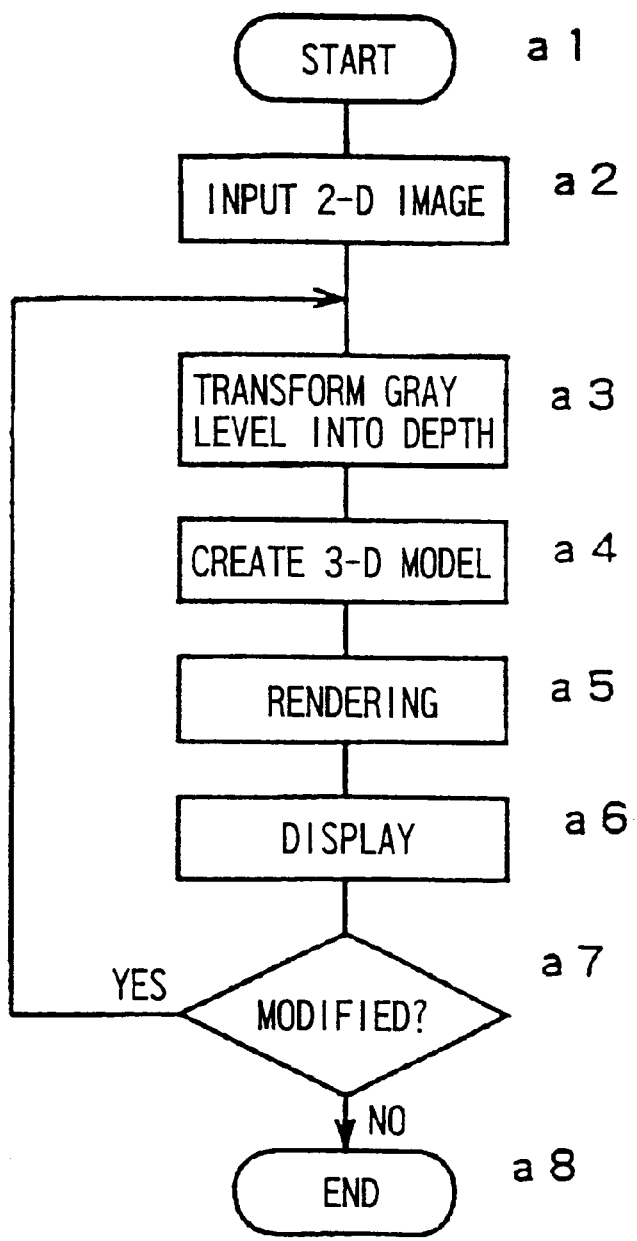
FIG. 2 is a flowchart showing an embodiment of processing procedures carried out by the three-dimensional model creating apparatus 20 of FIG. 1.
Figure 3:
FIG. 3 is a view showing an example of a monochrome two-dimensional image inputted in a two-dimensional image input section 1 of FIG. 1.
Figure 4A:
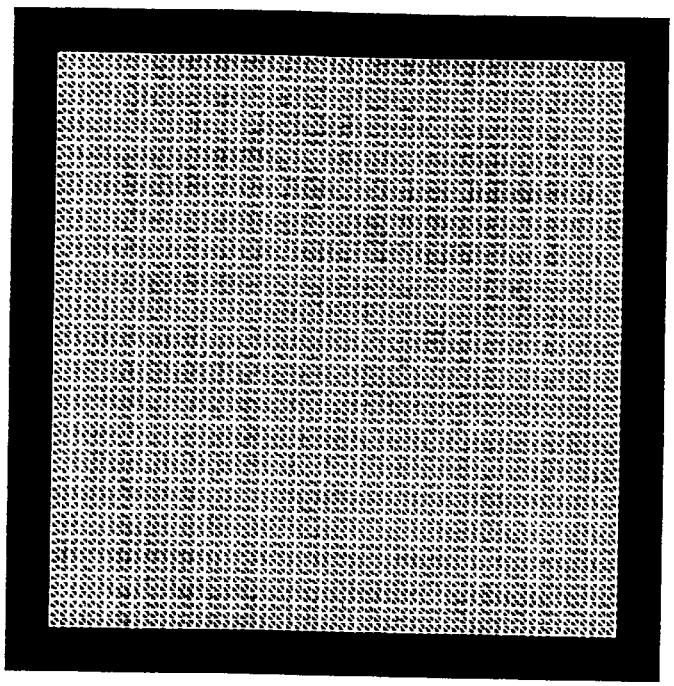
FIGS. 4A and 4B are respectively views showing an initialization state and a deformation state of a three-dimensional wire frame model which are a base of a three-dimensional model.
Figure 4B:
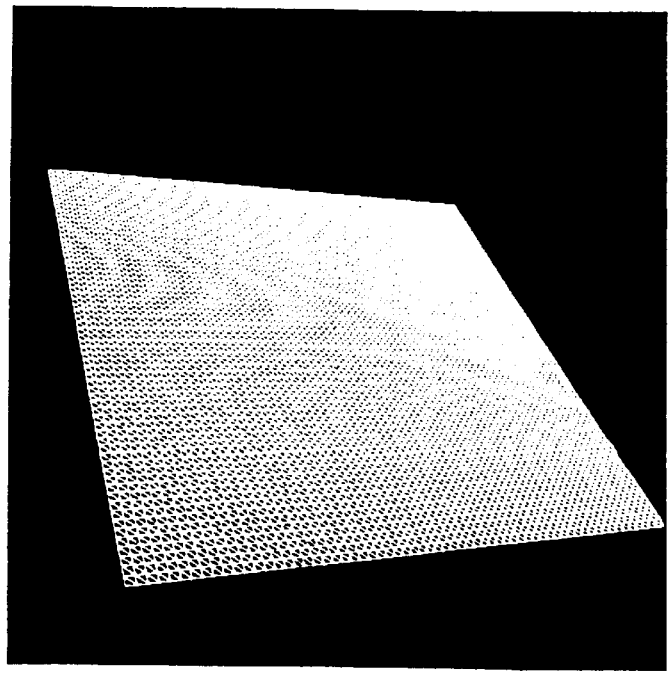
Figure 5:
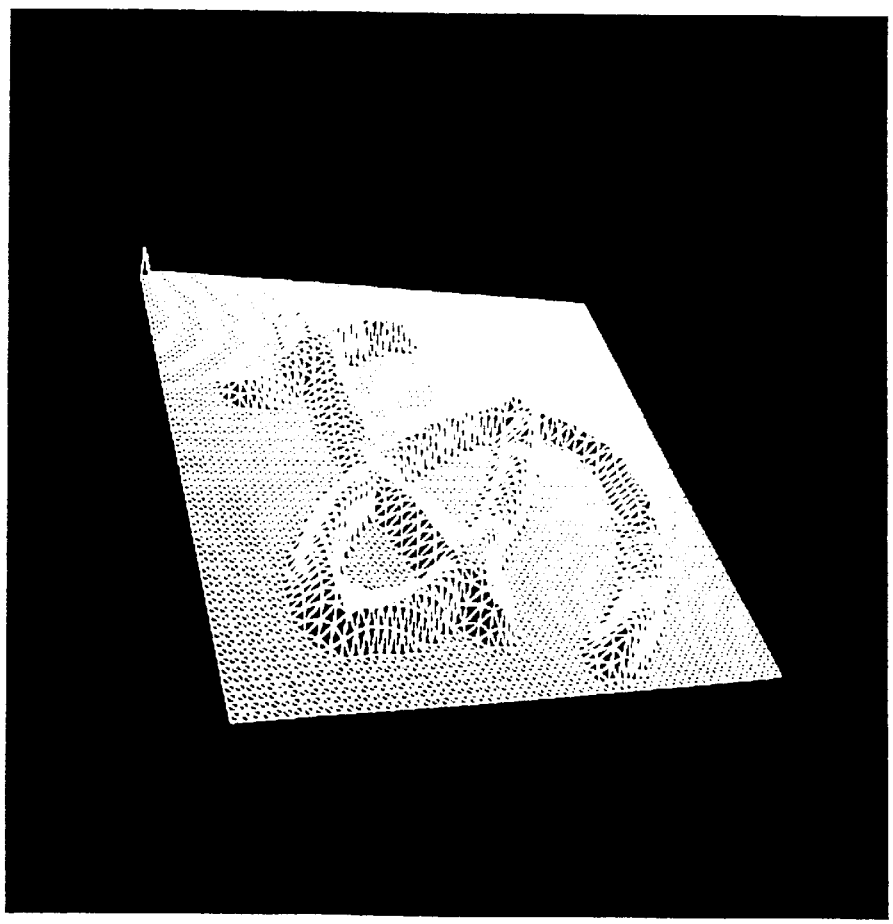
FIG. 5 is a view showing a three-dimensional wire frame model created in a three-dimensional modeling data producing section 8 of FIG. 1.

FIG. 2 schematically shows an image processing procedure carried out by the three-dimensional model creating apparatus 20 of FIG. 1. The processing procedure starts from step a1, and at step a2, a monochrome two-dimensional image, for example, a two-dimensional image as shown in FIG. 3 is inputted. At step a3, information on gradation in monochrome, which is one of a number of elements of the two-dimensional image as shown in FIG. 3, is extracted or aquired, and then, is transformed into three-dimensional depth information. For example, transformation of the gradations of the two-dimensional image into depth information, carried out using the 128th level of gradation as a reference color in 256-level gradation. In the case of 129 to 255 levels of gradation, a coordinate transformation is carried out in a direction protruding through the surface of the three-dimensional model. In a case of a 128th level of gradation, since the depth is in an unchanged state, the level is used in the case of erasing the depth information. Moreover, in a case of 0 to 127 levels of gradation, a coordinate transformation is carried out so as to be retraced to a side opposite to the surface of the three-dimensional model. At step a4, a wire frame model as shown in FIG. 4A is previously prepared as basic modeling data for determining a three-dimensional shape, and the depth information transformed at step a3 is added, and thus, a three-dimensional model is created. A basic shape of the wire frame model as shown in FIG. 4A is arbitrarily deformed as shown in FIG. 4B, and it is possible to set an arbitrary projection angle. In a stage of FIG. 4A, the correspondence relation between pixels is set on two-dimensional coordinates of the two-dimensional image of FIG. 3, and then, the correspondence relation of the two-dimensional coordinates of FIG. 3 with respect to the three-dimensionally deformed shape as shown in FIG. 4B is produced as mapping data in the three-dimensional modeling data producing section 8. When the depth information transformed at step a3 is further added, the two-dimensional image of FIG. 3 is transformed into a three-dimensional model expressed by a wire frame as shown in FIG. 5.

Figure 6:
FIG. 6 is a view showing a three-dimensional image which is generated by rendering in a rendering section 15 of FIG. 1.

At step a5, rendering is carried out by the rendering section 15 of FIG. 1. In rendering, according to two-dimensional bump data, a normal direction on the surface of the three-dimensional model is modulated, and two-dimensional texture data is mapped onto the surface of the three-dimensional model. The wire frame type three-dimensional model as shown in FIG. 5 may be also generated as a surface model type three-dimensional image as shown in FIG. 6 relative to a specific color without carrying out texture mapping in the rendering process, for example. At step a6, an image generated after rendering by the rendering section 15 is displayed. At step a7, a decision is made whether or not modification is made with respect to the two-dimensional image inputted to the two-dimensional image input section 1. In the case where a desired effect is not always obtained in the image displayed at step a6, modification is carried out with respect to the original two-dimensional image with the use of a drawing tool such as a pen or the like. When the modification is carried out, the sequence returns to step a3. In the case where no modification is carried out, the processing procedure ends at step a8.

In the case of carrying out modifications with respect to the three-dimensional image obtained by rendering, there are two kinds of modifications depending upon a direction of carrying out the modification, and these modifications are set so as to be changed over. These modifications are as follows.

1) A depth coordinate transformation is carried out in a vertical direction with respect to the surface of a three-dimensional model at a position specified by a pen regardless of a direction of the three-dimensional image expressed by rendering. A modification angle with respect to the surface of the three-dimensional model has no relation with a projection angle.

2) A depth coordinate transformation is carried out in a direction viewing from the display section 16 with respect to a position specified by the pen on the three-dimensional image expressed by rendering. A modification angle with respect to the surface of the three-dimensional model changes with the projection angle.

Figure 7:
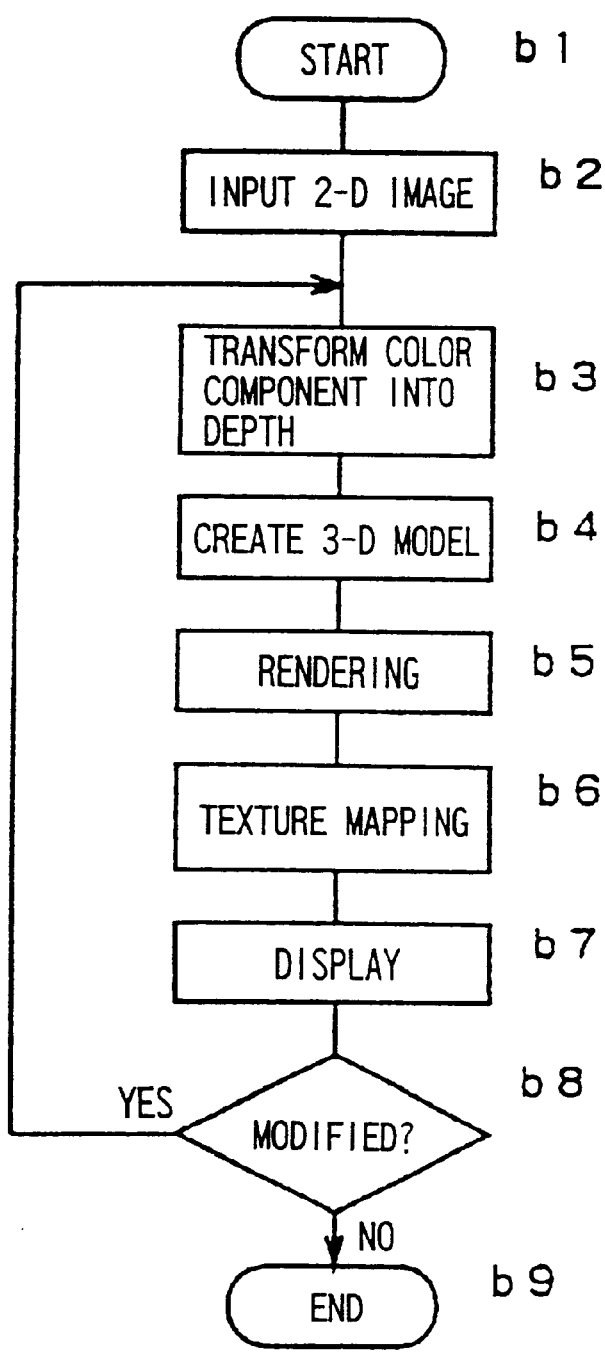
FIG. 7 is a flowchart showing a second embodiment of processing procedures carried out by the three-dimensional model creating apparatus 20 of FIG. 1.
Figure 8:
FIG. 8 is a view showing a color two-dimensional image which is inputted in the two-dimensional image input section 1 in the processing procedure of FIG. 7.
Figure 9:
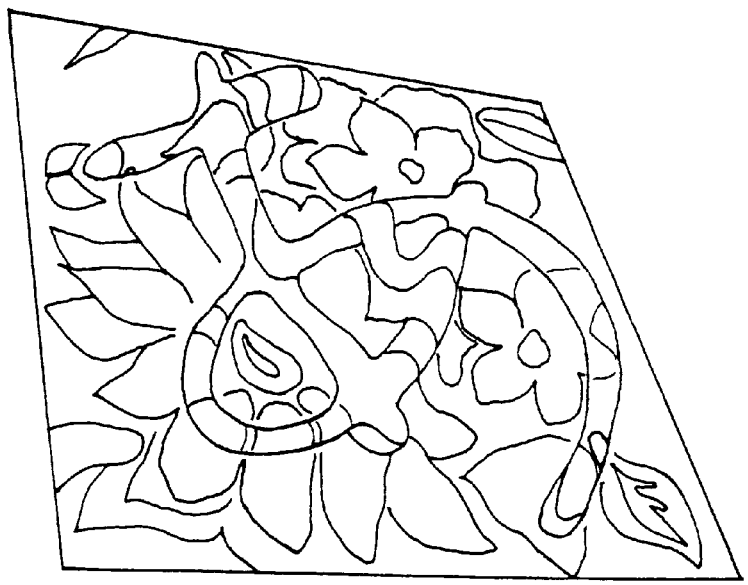
FIG. 9 is a view showing a three-dimensional rendering image obtained by extracting a color component of the color image of FIG. 8 in the processing procedure of FIG. 7.

FIG. 7 shows a processing procedure carried out by the three-dimensional model creating apparatus in FIG. 1 according to a second embodiment of the invention. The processing starts from step b1, and at step b2, the two-dimensional image is inputted in the same manner as that at step a2 of FIG. 2. In the embodiment, a color image as shown in FIG. 8 is used as the two-dimensional image. At step b3, a specific color component is extracted from the inputted color image as an element, and then, gradations of the extracted color component are transformed into three-dimensional depth information. At step b4, the three-dimensional model as shown in FIG. 5 is created likewise as step a4 of FIG. 2. At step b5, the same rendering as the three-dimensional image of FIG. 6 generated at step a5 of FIG. 2 is carried out on the basis of the three-dimensional model as shown in FIG. 5. At step b7, further, by rendering, the two-dimensional color image shown in FIG. 8 is subjected to texture mapping, on the surface of the three-dimensional image shown in FIG. 6, and thus, an image as shown in FIG. 9 is displayed. At step b8, in the case where modification is carried out with respect to the original two-dimensional image, the procedure returns to step b3. In the case where no modification is carried out, the procedure ends at step b9.

Figure 10:
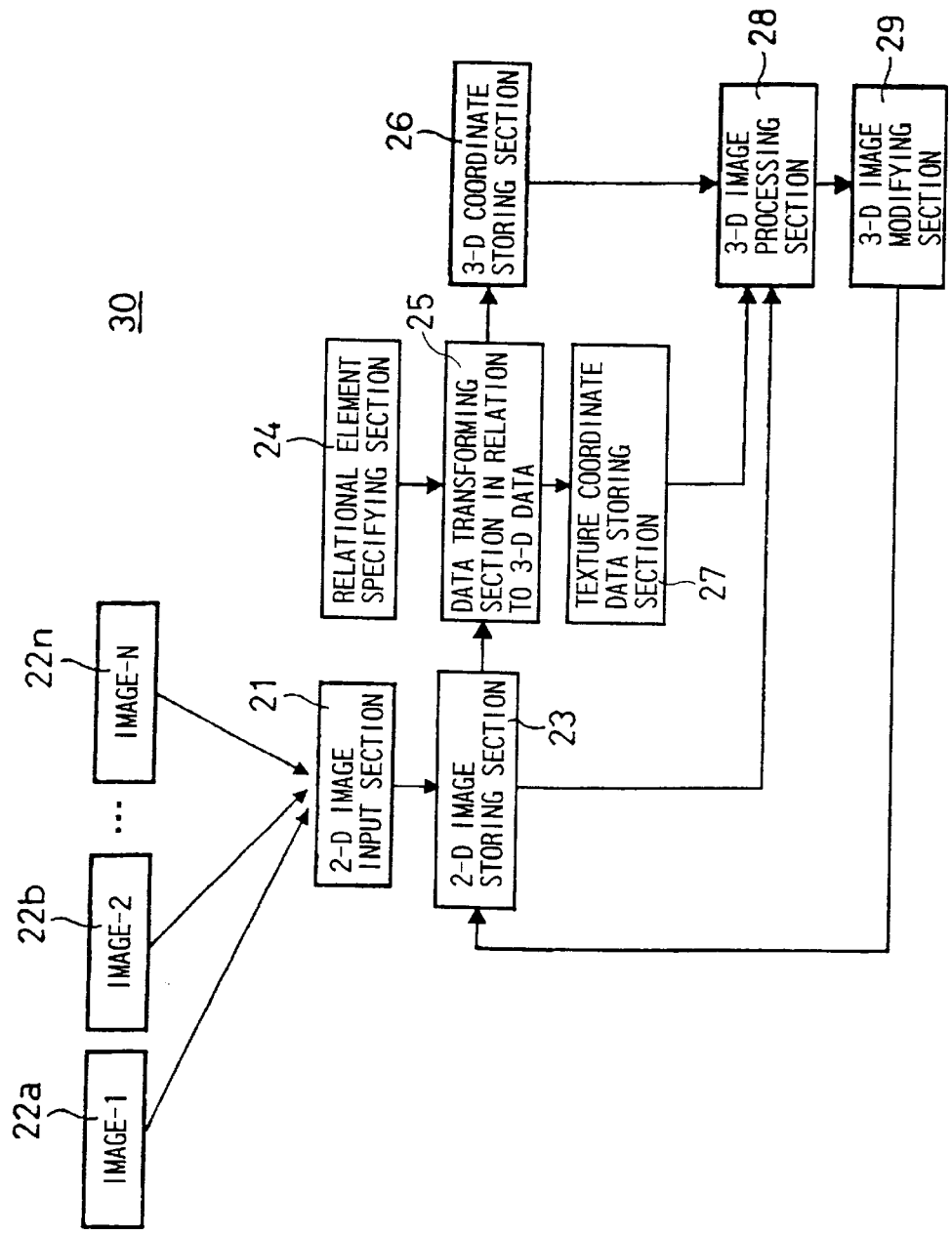
FIG. 10 is a block diagram schematically showing an electrical configuration of a three-dimensional model creating apparatus 30 functioning as a three-dimensional image generating apparatus according to a third embodiment of the invention.

FIG. 10 schematically shows a configuration of a three-dimensional image generating apparatus according to a third embodiment of the invention. A plurality of images 22a, 22b, . . . , 22n can be inputted to a two-dimensional image input section 21. Image data which expresses the inputted images 22a, 22b, . . . 22n is stored in a two-dimensional image storing section 23. An relational element specifying section 24 specifies an element to be extracted from the two-dimensional image which is a base for creating a three-dimensional model, and an element of the three-dimensional image into which the extracted element should be transformed. A data transforming section 25 in relation to three-dimensional data extracts the element specified by the relational element specifying section 24 from the image data which expresses the two-dimensional image stored in the two-dimensional image storing section 23, and then, converts it into three-dimensional information so as to be incorporated into the three-dimensional modeling data. The three-dimensional model coordinate data processed by the data transforming section 25 in relation to three-dimensional data is stored in a three-dimensional coordinate storing section 26. In the data transforming section 25 in relation to three-dimensional data, it is possible to produce texture coordinate data from the two-dimensional image inputted from the two-dimensional image input section 21, and the data thus produced is stored in a texture coordinate data storing section 27. A three-dimensional image processing section 28 uses the two-dimensional image stored in the texture coordinate data storing section 27 or the two-dimensional image storing section 23 as texture mapping information or bump mapping information. Then, by the three-dimensional image processing section 28, the three-dimensional model based on the three-dimensional modeling data stored in the three-dimensional coordinate storing section 26 is subjected to rendering, and is generated as a three-dimensional image. Further, the three-dimensional image processing section 28 may be provided with a rendering memory, and arranged so as to store a three-dimensional image data obtained by rendering. Also, it is possible to modify the contents stored in the rendering memory while seeing a displayed image by a three-dimensional image modifying section 29. The modification provided by the three-dimensional image modifying section 29 is incorporated into the two-dimensional image stored in the two-dimensional image storing section 23, and the modification result of the two-dimensional image is again incorporated into the three-dimensional image to display.

In the modification of the three-dimensional image by the three-dimensional image modifying section 29, two kinds of pens are prepared, and these pens are changeable for three-dimensional model modification and for texture image modification. The kind of pen is changed for three-dimensional model modification and for texture image modification so as to modify the image data stored in the rendering memory of the three-dimensional image processing section 28. Thereby, it is possible to modify the two-dimensional texture image data for subjecting the surface of the three-dimensional image to texture mapping. Also, it is possible to modify the texture image while seeing image data obtained by rendering, so that the image data can be readily modified.

In the case of modifying an image, a predetermined area including a pixel where drawing is carried out in order to modify is set, and then, it is possible to carry out image processing for modifying only in the area thus set. Therefore, there is no need for modifying all image data. Moreover, reverse mapping data is prepared so as to correspond mapping data to a pixel on the two-dimensional image from a backward direction, that is, from the pixel on the three-dimensional image. Thereby, it is possible to further rapidly carry out a modification from the three-dimensional image to the two-dimensional image.

Figure 11:
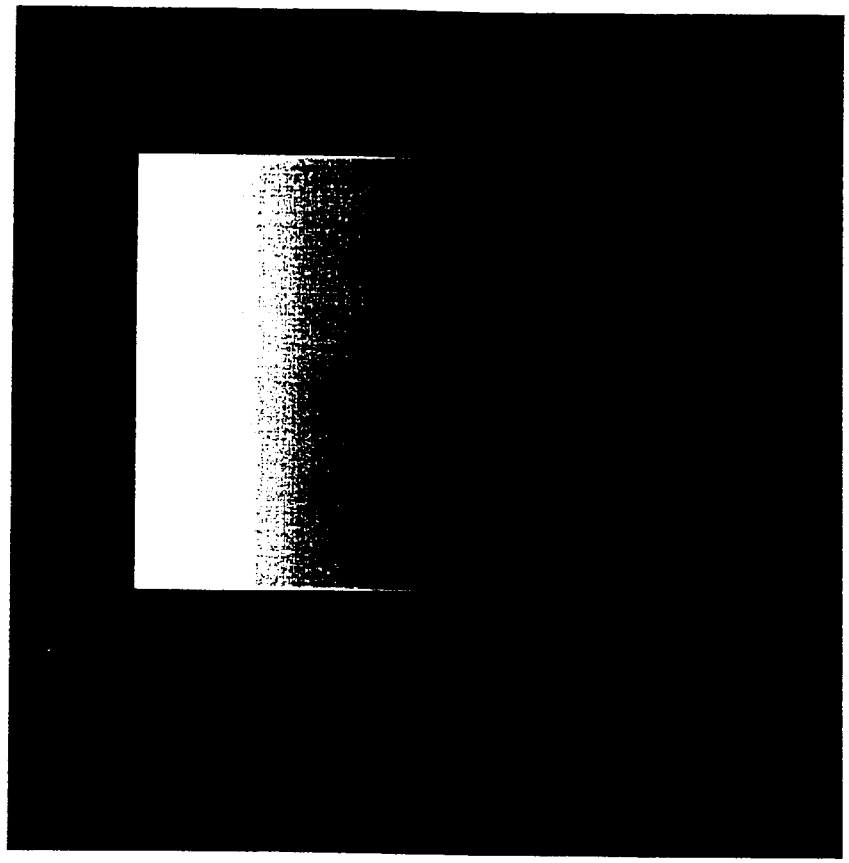
FIG. 11 is a view showing one of a plurality of two-dimensional images which are inputted in a two-dimensional image input section 21 of FIG. 10.
Figure 12:
FIG. 12 is a view showing an example of a three-dimensional image obtained from a three-dimensional image processing section 28 in the embodiment of FIG. 10.

In the three-dimensional model creating apparatus 30 which functions as the three-dimensional image generating apparatus as shown in FIG. 10, for example, the monochrome image as shown in FIG. 3 and the color image as shown in FIG. 8 are used as the images 22a and 22b, respectively, and then, are inputted as two-dimensional images for creating a three-dimensional model. Further, it is possible to input the two-dimensional image used as texture data and bump data and the image as shown in FIG. 11 used as the image 22n. More specifically, a plurality of two-dimensional images are inputted to the two-dimensional image input section 21, and the two-dimensional image storing section 23 stores the inputted plurality of two-dimensional images. Thus, it is possible to freely select the two-dimensional image for creating a three-dimensional model, the two-dimensional image for texture mapping or the like. The three-dimensional coordinate storing section 26 can store the three-dimensional modeling data as shown in FIG. 5. As an example of the image obtained by the three-dimensional image processing section 28, in FIG. 12, there is shown a three-dimensional image generated in such a manner that one color component is extracted from the color image data shown in FIG. 8 likewise in FIG. 7, and is incorporated into depth information, and thereafter, the original two-dimensional color image shown in FIG. 8 is subjected to texture mapping.

Figure 13:
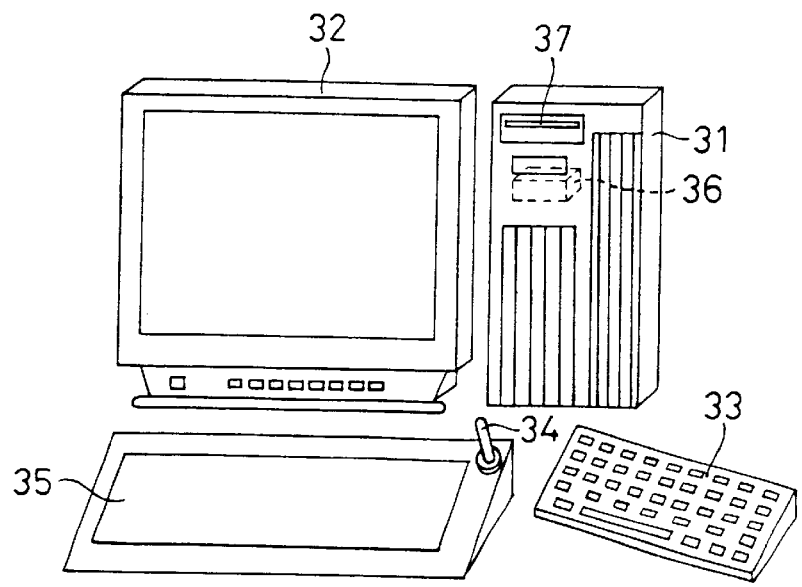
FIG. 13 is a perspective view simply showing an example of a configuration of hardware to realize the three-dimensional model creating apparatus 20 of FIG. 1 or the three-dimensional model creating apparatus 30 of FIG. 10.

FIG. 13 shows a computer 31 and peripheral equipment required for realizing the three-dimensional model creating apparatus 20 or 30 as shown in FIG. 1 or 10. As the computer 31, a work station, personal computer or the like are applicable. In order to display an image, a display apparatus 32, such as a cathode-ray tube (CRT), liquid crystal display (LCD) is used. A keyboard 33 is used for inputting various data to the computer 31. In order to draw and input an image to the computer 31, a pen 34 and a tablet 35 are used as a pair. The computer 31 houses a semiconductor memory and a hard disk as an internal storage 36. Further, the computer 31 is provided with a reproducing device for a recording medium such as a CD-ROM, a DVD-ROM or a floppy disk, as an external storage device 37. A program for operating the computer 31 as the three-dimensional model creating apparatus 20 of FIG. 1 or as the three-dimensional model creating apparatus 30 of FIG. 10 is recorded on the CD-ROM or the like, and then, the CD-ROM is inserted into the external storage device 37. Also, the computer 31 may be connected to a local area network (LAN), an internet or the like, and then, be operated by downloading programs from these networks. Further, the two-dimensional image to be inputted to the two-dimensional image input sections 1 and 21 can be inputted from the recording medium or the network as a created image data file, or be inputted by drawing with the use of the pen 34 and the tablet 35. In addition, custom-made hardware is applicable as the computer 31.

Figure 14:
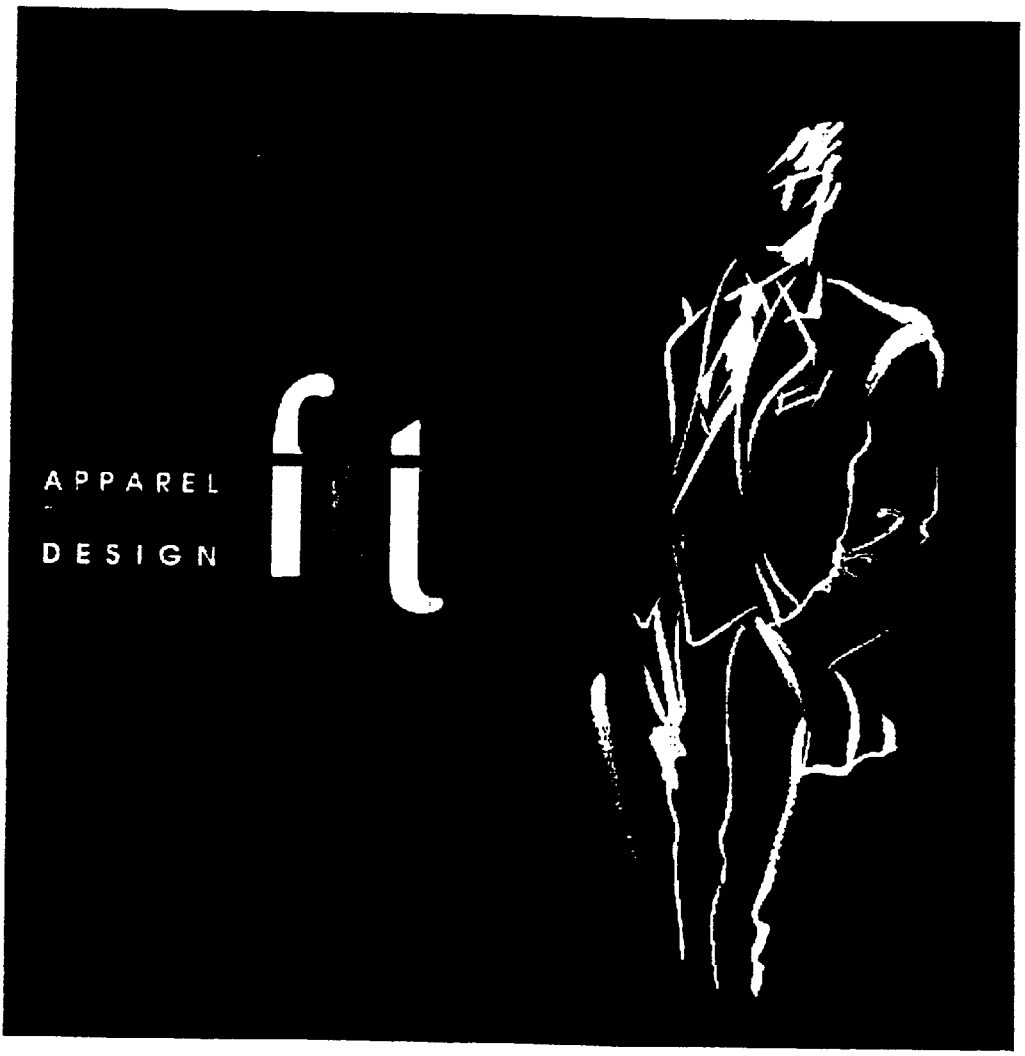
FIG. 14 is a view showing another example of a two-dimensional image which is a base for three-dimensional processing carried out in the embodiment of FIG. 1 or FIG. 10.
Figure 15:
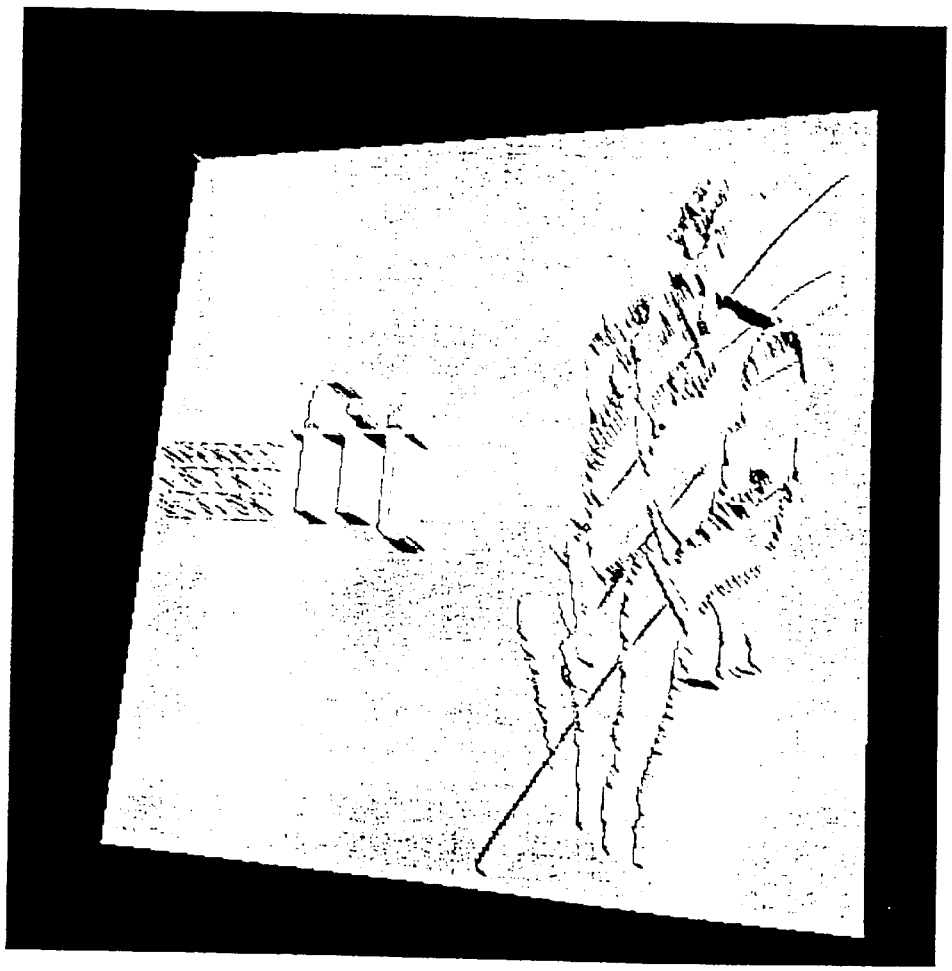
FIG. 15 is a view showing a three-dimensional rendering image obtained on the basis of the two-dimensional image of FIG. 14.
Figure 16:
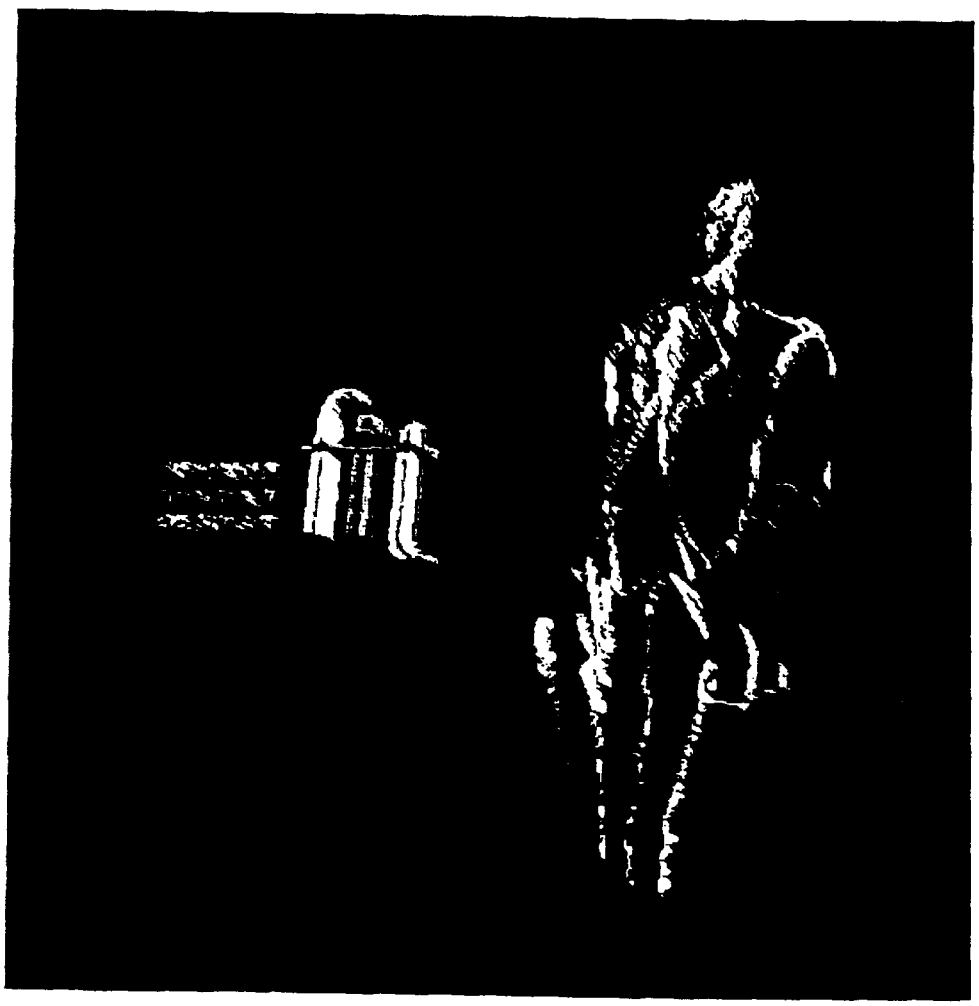
FIG. 16 is a view showing a three-dimensional image generated so that the two-dimensional image of FIG. 14 is subjected to texture matching processing on the three-dimensional rendering image of FIG. 15.

FIGS. 14 to 16 each show an example of an image which can be displayed as a three-dimensional image based on a two-dimensional image with the use of the three-dimensional model creating apparatus 20 or 30 shown in FIG. 1 or 10. Gradations of each color are transformed into three-dimensional depth information, from a color two-dimensional image as shown in FIG. 14, to generate a three-dimensional rendering image as shown in FIG. 15. Further, the original two-dimensional image as shown in FIG. 14 is subjected to texture mapping on a surface of the three-dimensionally transformed rendering image of FIG. 15, and thereby, a three-dimensional image as shown in FIG. 16 can be readily obtained.

Figure 17:
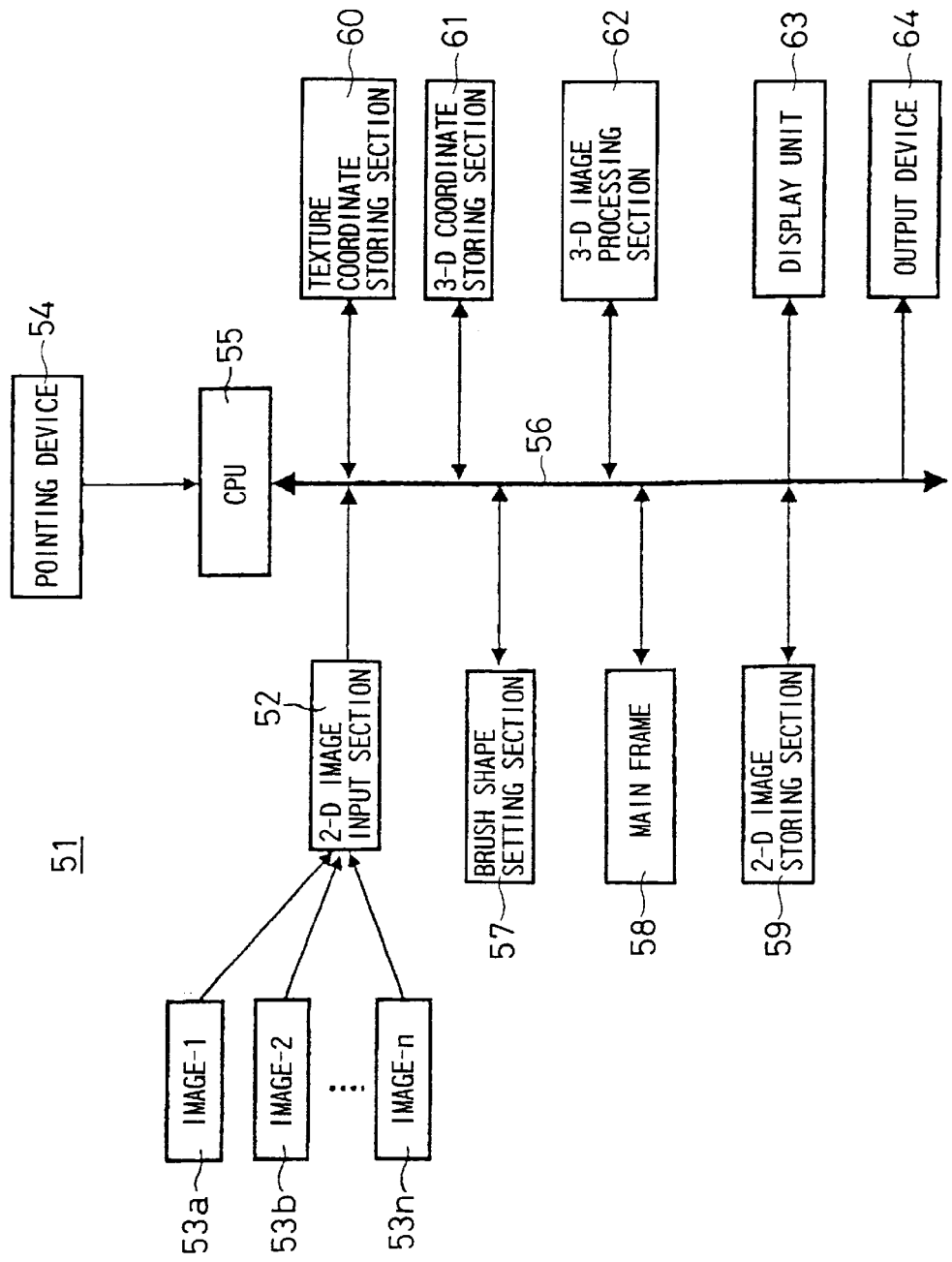
FIG. 17 is a block diagram schematically showing an electrical configuration of a three-dimensional image processing apparatus 51 functioning as a three-dimensional image generating apparatus according to a fourth embodiment of the invention.

FIG. 17 schematically shows an electrical configuration of a three-dimensional image processing apparatus 51 functioning as a three-dimensional image generating apparatus according to a fourth embodiment of the invention. A plurality of images 53a, 53b, . . . , 53n, which are two-dimensional images previously generated, can be inputted to a two-dimensional image input section 52 as image data. A two-dimensional image can be drawn by using a pointing device 54 such as a mouse, a tablet system or the like. Image processing by the three-dimensional image processing apparatus 51 is carried out according to a program operation of a CPU 55. The CPU 55 is connected, via a bus 56, to the two-dimensional image input section 52, a brush shape setting section 57, a main frame 58, a two-dimensional image storing section 59, a texture coordinate storing section 60, a three-dimensional coordinate storing section 61, a three-dimensional image processing section 62, a display unit 63 and an output device 64 or the like. When the pointing device 54 is operated by a user, the pointing device provides an interrupt signal to the CPU 55 so as to inform the CPU 55 that an input operation is being carried out. Then, the CPU 55 inputs information such as two-dimensional coordinates expressed by the pointing device 54 and pressure applied by a pen, via an interface connected to the bus 56 or the like.

The brush shape setting section 57 defines a line width and shape of a brush in the case of,using the pointing device 54 as a brush tool. The main frame 58 is a work area memory in a case of carrying out two-dimensional image processing for subjecting a two-dimensional image to various image processing. The two-dimensional image storing section 59 stores a two-dimensional image inputted to the two-dimensional image input section 52, a two-dimensional image drawn by the pointing device 54, or a two-dimensional image processed by the main frame 58. The two-dimensional image thus stored includes a density map, texture, bump, mask or the like.

Texture mapping information is stored in the texture coordinate storing section 60. In the three-dimensional coordinate storing section 61, coordinate information which defines a shape which is a base of the three-dimensional display in relation to the two-dimensional image is stored as modeling data. The modeling data has a surface formed by a pixel corresponding to a pixel of the two-dimensional image, and includes an arbitrary deformation state and projecting direction. By a technique of adding a predetermined thickness to the two-dimensional image, it is possible to directly generate a three-dimensional image from the two-dimensional image. In this case, there is no need for defining a basic shape of the three-dimensional display and storing coordinate information in the three-dimensional coordinate storing section 61. In the three-dimensional image processing section 62, according to the modeling data stored in the three-dimensional coordinate storing section 61, to the mapping information corresponding to a mask, to texture and bump stored in the two-dimensional image storing section 59, or with reference to mapping information having the correspondence relation when element information extracted from the two-dimensional image is incorporated into a three-dimensional shape, a three-dimensional image is generated by rendering. Further, the three-dimensional image processing section 62 is provided with a rendering memory for rendering. The display unit 63 displays a three-dimensional image generated by the three-dimensional image processing section 62 on a display screen such as a cathode-ray tube (CRT), a liquid crystal display (LCD) or the like. Moreover, in this embodiment, the two-dimensional image stored in the two-dimensional image storing section 59 and the two-dimensional image drawn with the use of the pointing device 54, can be displayed on the display unit 63.

In the case of drawing the two-dimensional image with the use of the brush tool, it is possible to directly create a three-dimensional model according to the selected brush shape. In this case, as described above, there is no need for storing coordinate information of a basic shape in the three-dimensional coordinate storing section 61, and it is possible to minimize the required number of polygons configuring the wire frame.

The display unit 63 has a predetermined limit in its size and resolution. In order to obtain a high image quality equivalent to a photograph or printed matter, there is a need for outputting an image having a resolution higher than a displayable resolution. The output device 64 is, for example, a high density color laser printer or color inkjet printer, and therefore, can output a three-dimensional image having a high resolution.

Figure 18:
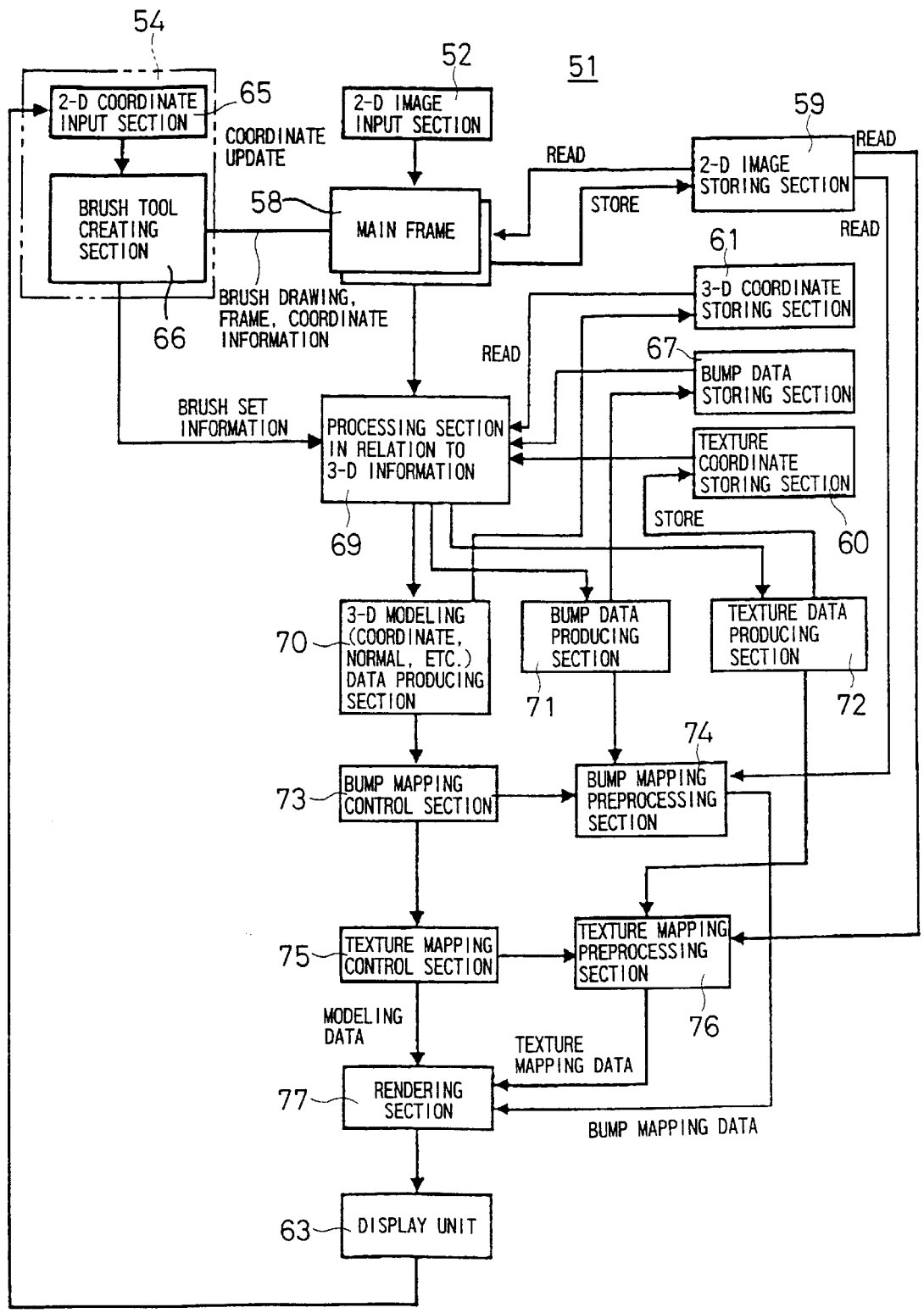
FIG. 18 is a block diagram showing a logical configuration of the three-dimensional image processing apparatus 51 of FIG. 17.

FIG. 18 shows a functional configuration of a three-dimensional image being generated from a two-dimensional image with the use of the three-dimensional image processing apparatus 51 according to the embodiment of FIG. 17. The same reference numerals are used to designate parts corresponding to the configuration of FIG. 17, and a repeated explanation is omitted. Parts, which are not involved in the configuration of FIG. 17, are mainly realized by operation of programs of the CPU 55. The pointing device 54 of FIG. 17 includes a two-dimensional coordinate input section 65 and a brush tool creating section 66. In the two-dimensional coordinate input section 65, coordinates which express a line and point drawn by a pen of a tablet system and a change in relative coordinates outputted by the mouse are inputted, for example. Preferably, the two-dimensional coordinate input section 65 has a function of inputting a pen pressure, that is, a force by which a user presses the pen or the like against the tablet. In the brush tool creating section 66, the latest coordinates inputted from the two-dimensional coordinate input section 65 is inputted, and information on a frame and coordinates which are an object of brush drawing in accordance with a preset brush shape are outputted. Further, in the case where the coordinates drawn by the brush are an image displayed as a two-dimensional image, the two-dimensional coordinates are transformed into three-dimensional coordinates, and in the case where the coordinates drawn by the brush are an image displayed as a three-dimensional image, the three-dimensional coordinates are transformed into two-dimensional coordinates.

A processing section 69 in relation to three-dimensional information has a relation with a plurality of frames, and carries out two-dimensional image processing on the main frame 58 in accordance with the frame specified by the brush tool creating section 66 and coordinate information. Also, the two-dimensional image inputted from the two-dimensional image input section 52 is temporarily stored in one frame of the main frame 58, and further, is stored in the two-dimensional image storing section 59. The two-dimensional image stored in the two-dimensional image storing section 59 is read on the main frame 58, and then, it is possible to carry out processing with respect to the two-dimensional image.

The processing section 69 in relation to three-dimensional information carries out relating processing of a two-dimensional image to a three-dimensional image. In relating processing, with reference to brush set information from the brush tool creating section 66, and to modeling data, bump data, and texture coordinates respectively stored in the three-dimensional coordinate storing section 61, in the bump data storing section 67, and in the texture coordinate storing section 60, these three-dimensional information is related to element information extracted from the two-dimensional image. The three-dimensional information related in the processing section 69 in relation to three-dimensional information is incorporated into a three-dimensional model in the three-dimensional image processing section 62, and thus, a three-dimensional image is generated. Further, in the processing section in relation to three-dimensional information, a brush shape for directly creating the three-dimensional model may be set.

The three-dimensional image processing section 62 includes a three-dimensional modeling data producing section 70, a bump data producing section 71, a texture data producing section 72, a bump mapping control section 73, a bump mapping preprocessing section 74, a texture mapping control section 75, a texture mapping preprocessing section 76 and a rendering section 77. The three-dimensional modeling data producing section 70 creates a wire frame model which expresses a three-dimensional shape as data on coordinates of a vertex and a normal direction. The three-dimensional modeling data produced is stored in the three-dimensional coordinate storing section 61. The texture data producing section 72 produces mapping data of texture information added to the surface of the three-dimensional model as coordinate data with respect to a color, shading, and texture on an object's surface, and then, the coordinate data thus produced is stored in the texture coordinate storing section 60.

The three-dimensional modeling data produced in the three-dimensional modeling data producing section 70 is supplied to the rendering section 77 after the ON/OFF control by the bump mapping preprocessing section 74 is carried out in the bump mapping control section 73, and the ON/OFF control by the texture mapping preprocessing section 76 is carried out in the texture mapping control section 75. In response to texture mapping data and bump mapping data from the bump mapping preprocessing section 74 or the texture mapping preprocessing section 76, the rendering section 77 carries out texture additive processing based on the texture mapping data and bump additive processing based on the bump mapping data, on the specified surface of three-dimensional image from three-dimensional modeling data producing section 70. Thereafter, a three-dimensional image is generated. The three-dimensional image thus generated is displayed on the display unit 63. Moreover, it is possible to carry out a drawing operation for modifying the image with respect to the two-dimensional coordinate input section 65 on the basis of the image displayed by the display unit 63.

The two-dimensional image input section 52 of FIGS. 17 and 18 can draw and input the two-dimensional image as shown, for example, in FIGS. 3 and 8 by the paint tool. FIG. 3 shows a monochrome image, and FIG. 8 shows a color image. All of these two-dimensional images may be directly drawn and inputted, and in addition, it is possible to input these images as file image data, and to input them in combination with a drawing operation for modifying a part of the image. The three-dimensional displayed image as shown in FIG. 9 corresponding to the color image of FIG. 8 is obtained from the display unit 13 or the output device 14. FIG. 9 shows an image generated so that gradations on a red component of the color image of FIG. 8 are incorporated into depth information, and further, the whole of the two-dimensional image of FIG. 8 is subjected to texture mapping processing on the surface thereof.

In the wire frame three-dimensional model created by the three-dimensional modeling data producing section 70 of FIG. 18, as shown in FIG. 5, gradations of the two-dimensional image are. incorporated into depth information in a normal direction of the surface of polygon with respect to the modeling data which expresses a basic shape of the three-dimensional model so as to impart three-dimensional effect. For example, in the case of transforming the gradations of the two-dimensional image into depth information, a 256-level gradation is set, and the 128th level is set as a reference color. In the case of a gradation ranging from 129 to 255 level, a coordinate transformation is carried out in a direction protruding from the surface of the image. In the case where the level of gradation is 128, there is no change in the depth. Therefore, the level of gradation 128 is used for erasing the depth information. Also, in the case where the level of gradation ranges from 0 to 127, the coordinate transformation is carried out in such a direction retracting from the surface of the three-dimensional model.

Figure 19A:
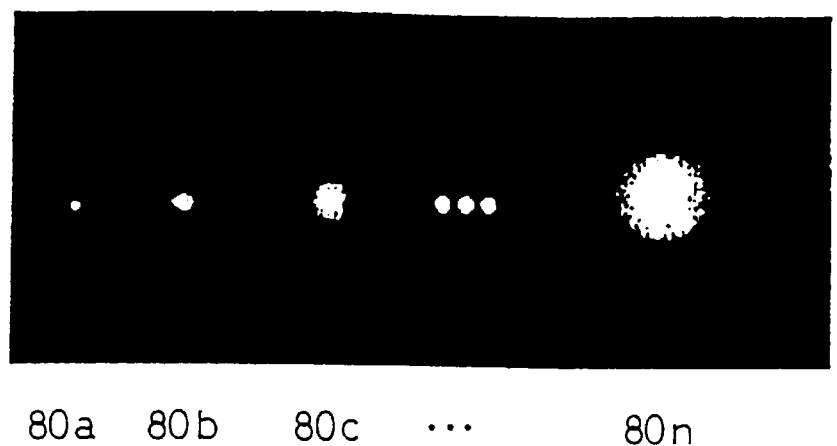
FIGS. 19A and 19B are respectively views showing an example of a diameter and a shape of a brush set in a brush shape setting section 57 of FIG. 17.
Figure 19B:
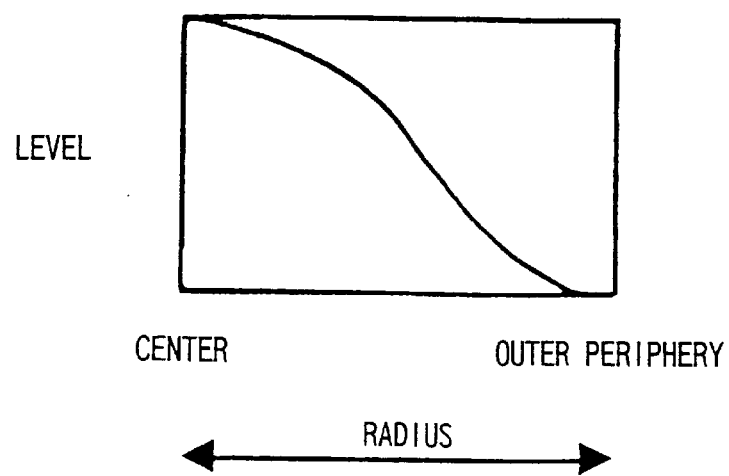

FIG. 19A and FIG. 19B respectively show brush shape and a shapes set by the brush shape setting section 57 of FIG. 18. FIG. 19A shows several examples of brush shapes, that is, each outer diameter of brushes 80a, 80b, 80c, . . . , 80n having a circular cross section. These brushes 80a, 80b, 80c, . . . , 80n each have a shape shown by a diameter around the two-dimensional coordinates specified by the pointing device 54. In the extent in the diametrical direction, as shown in FIG. 19B, it is possible to specify a shape such that a level continuously changes from the center toward outer edge. By specifying the form of the shape, it is possible to clarify the difference between the drawing tool expressed by the brush, for example, whether the drawing tool is a soft tool such as a writing brush or a hard tool such as a pencil. Further, according to the specified shape, it is possible to obtain an effect which will not be realized by an actual drawing tool. Several kinds of brush shapes may be previously prepared so as to be selected, and also, data may be directly modified.

Figure 20A:
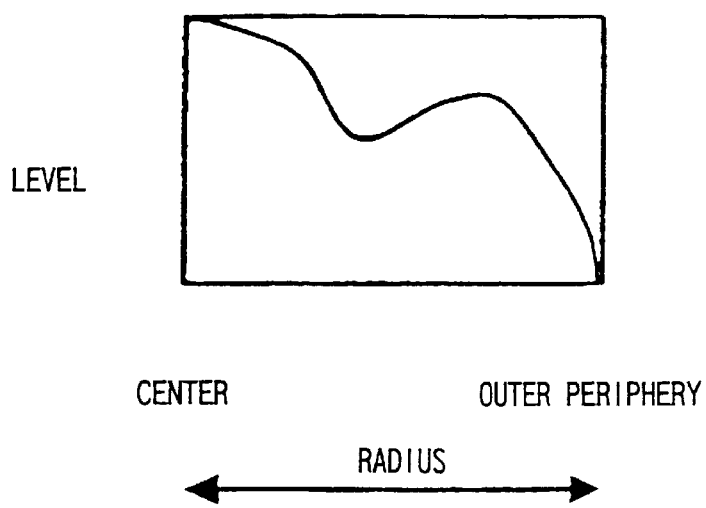
FIGS. 20A and 20B are respectively views showing an example of a shape change in the brush shapes set in the brush shape setting section 57 of FIG. 17.
Figure 20B:
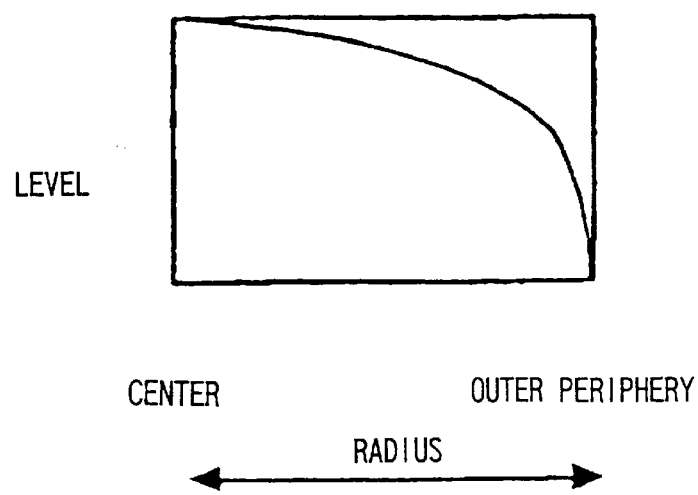
Figure 21A:
FIGS. 21A and 21B are respectively views showing a two-dimensional image drawn using the shapes of FIGS. 20A and 20B.
Figure 21B:

FIG. 20A and FIG. 20B, FIG. 21A and FIG. 21B, FIG. 22A and FIG. 22B and FIG. 23 show examples of expression flexibility of the brush shape. FIG. 20A and FIG. 20B show examples of two kinds of shapes for expressing brush shapes. In a drawing operation by the paint tool, in accordance with the level, a drawing content by the brush is replaced with a background image. In the case where the brush level is 100%, the drawing content is all replaced with the background image. In the case where the brush level is 0%, the content of the background image remains as it is. In the case where the brush level is an intermediate level, in accordance with the level, the effect of the drawn content and the content of the background image are mixed together is obtained. FIG. 21A shows an example of a two-dimensional image which is drawn by means of the brush shape having the shape shown in FIG. 20A with a fixed line width. This drawing is carried out by using a pen having no pen pressure input function, or is carried out with a fixed pen pressure in the case of using a pen having a pen pressure input function. FIG. 21B shows a two-dimensional image which is drawn by means of the brush shape of the shape shown in FIG. 20B while the pen pressure and the line width are changed.

FIG. 22A and FIG. 22b each show a three-dimensional image formed in a manner that gradations in monochrome of the two-dimensional image shown in FIG. 21A and FIG. 21B are incorporated into depth information. The three-dimensional images, which reflect the two-dimensional images of FIG. 21A and FIG. 21B, are displayed together with three-dimensional modeling data which is a base of FIG. 22A and FIG. 22B. FIG. 23 shows a three-dimensional image generated in a manner of erasing parts corresponding to the basic three-dimensional modeling data which is displayed together in FIG. 22B, so that the two-dimensional image shown in FIG. 21 B seems to be three-dimensionalized solely. The process for generating the three-dimensional image as shown in FIG. 23 will be explained later.

Figure 24:
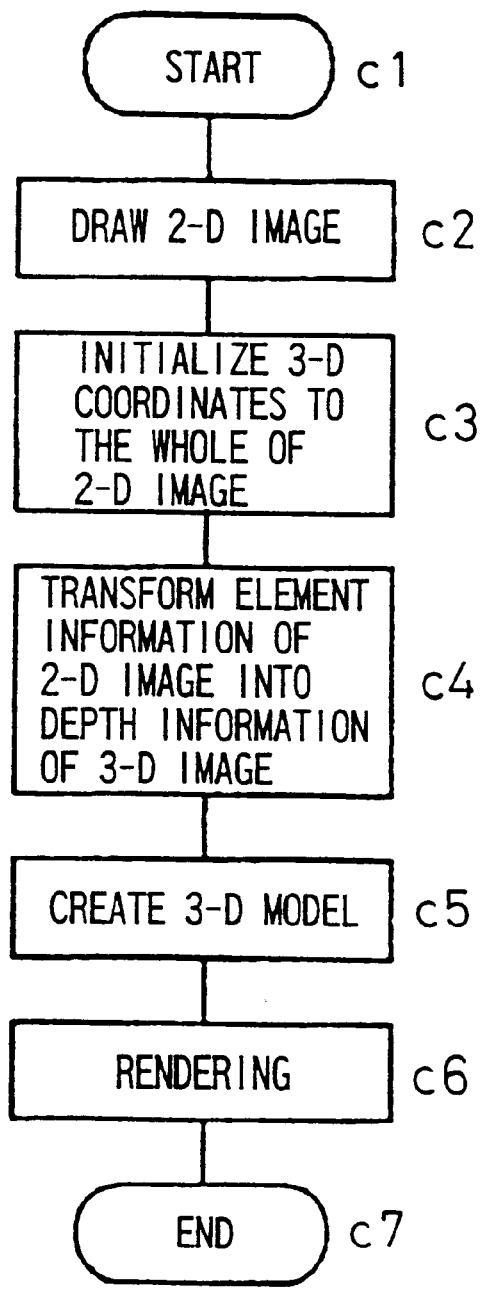
FIG. 24 is a flowchart showing a basic processing procedure of the embodiment of FIG. 17.

FIG. 24 shows a procedure for drawing a three-dimensional image in the embodiment of FIG. 17. The procedure starts from step c1, and at step c2, a two-dimensional image is drawn with the use of the pointing device 54, and then, is input as a two-dimensional image. At step c3, a three-dimensional coordinate initialization is carried out with respect to the whole of the two-dimensional image so that three-dimensional modeling data is produced. For example, the two-dimensional wire frame as shown in FIG. 4A is made to correspond to the deformed three-dimensional wire frame as shown in FIG. 4B, thereby creating the three-dimensional modeling. At step c4, predetermined element information is extracted from the two-dimensional image inputted at step c2, and then, is transformed into a depth coordinate of the three-dimensional coordinates. The element information includes, for example, gradation information in monochrome extracted from the monochrome two-dimensional coordinates, and gradation information regarding a specific color component extracted from the color image. At step c5, the depth coordinate of the three-dimensional coordinates transformed at step c4 is added to the three-dimensional modeling data produced at step c3, and thus, the wire frame three-dimensional model as shown in FIG. 5 is created. At step c6, for example, the three-dimensional image as shown in FIG. 6 is generated by rendering. FIG. 6 shows the three-dimensional image after rendering, corresponding to the monochrome two-dimensional image of FIG. 3. The image may be made as a surface model by specifying a color when carrying out no texture mapping, with respect to the three-dimensional modeling data. FIG. 25 shows a three-dimensional image which is generated in a manner that the original two-dimensional color image itself is texture-mapped with respect to a three-dimensional model, which is formed in a manner of transforming one color component of the color two-dimensional image of FIG. 8 into a depth coordinate.

Figure 28A:
FIGS. 28A and 28B are respectively views showing an example of a three-dimensional image generated at step d7 of FIG. 26.
Figure 28B:

FIG. 26 show a processing procedure according to another embodiment of the invention. In this embodiment, the processing procedure starts from step d1, and step d2, step d3 and step d4 are the same process as step c1, step c2, step c3 and step c4 of FIG. 24. At step d5, the basic modeling data of the three-dimensional model as shown in FIG. 4B, data not being influenced by the transformation into the depth coordinate of the three-dimensional coordinates as shown in FIG. 5 at step d4 is erased. At step d6, a three-dimensional wire frame model is created likewise, and at step d7, the three-dimensional image is generated by rendering likewise, and thus, the processing procedure ends at step d8. In this embodiment, of polygons configuring the wire frame, the parts not being changed in a normal direction are erased. Therefore, as shown in FIG. 27, at step d6, only changed parts of the three-dimensional model remain. Rendering of the three-dimensional model of step d6 results in FIG. 28A and FIG. 28B. The three-dimensional images of FIG. 28A and FIG. 28B are generated so as to reflect the two-dimensional images of FIG. 3 and FIG. 8, respectively.

Figure 30A:
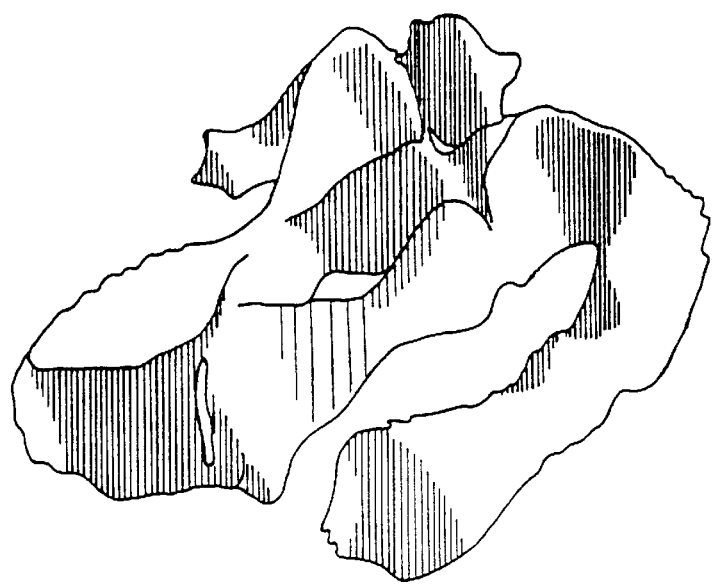
FIGS. 30A and 30B are respectively views showing a three-dimensional image generated by subjecting the three-dimensional model of FIG. 29 to rendering.
Figure 30B:
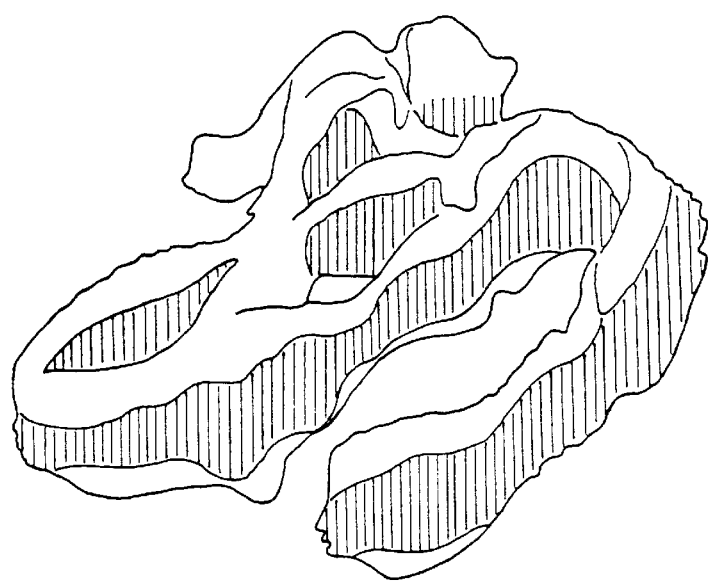

In the three-dimensional image as shown in FIG. 23, before erasing the three-dimensional modeling data of unchanged parts at step d5 of FIG. 26, in transforming the element information of the two-dimensional image into the depth information of the three-dimensional coordinates at step d4, a coordinate transformation is carried out in a direction protruding from the surface, and simultaneously, a coordinate transformation is carried out in a direction retracting from the surface which is opposite to the direction protruding from the surface. In other words, in the case where a change protruding from the three-dimensional surface is obtained in the coordinate transformation into the depth direction, a change retracting from the three-dimensional surface is simultaneously given, and thus, a three-dimensional model as shown in FIG. 29 is created. In this case, basic modeling data of the three-dimensional model shown in FIG. 29 is different from that of FIG. 5. Based on the two-dimensional image of FIG. 3 and FIG. 8, when subjecting the three-dimensional model as shown in FIG. 29 to rendering, a three-dimensional image as shown in FIG. 30A or FIG. 30B is obtained. As explained with reference to FIG. 23, such a three-dimensional image may be obtained as a three-dimensional image having a shape such that a fluid such as paint is squeezed from a paint tube.

Figure 31:
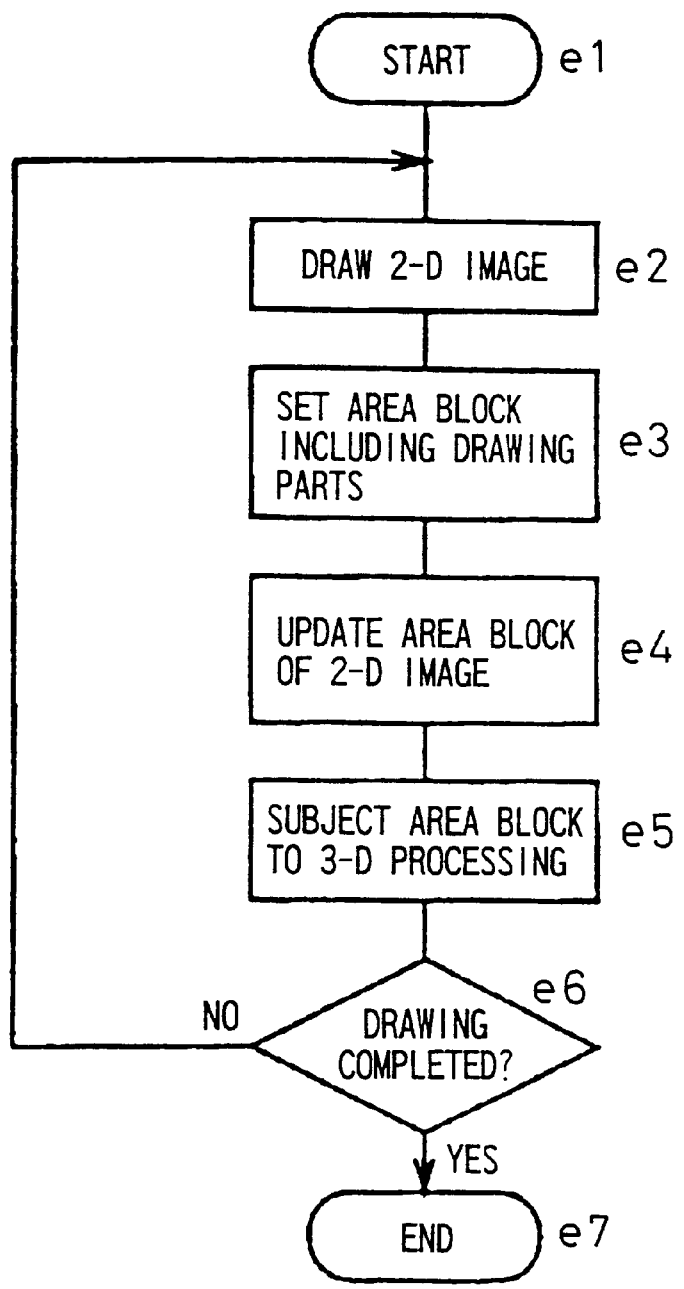
FIG. 31 is a flowchart showing a processing procedure according to still another embodiment of the invention.
Figure 32:
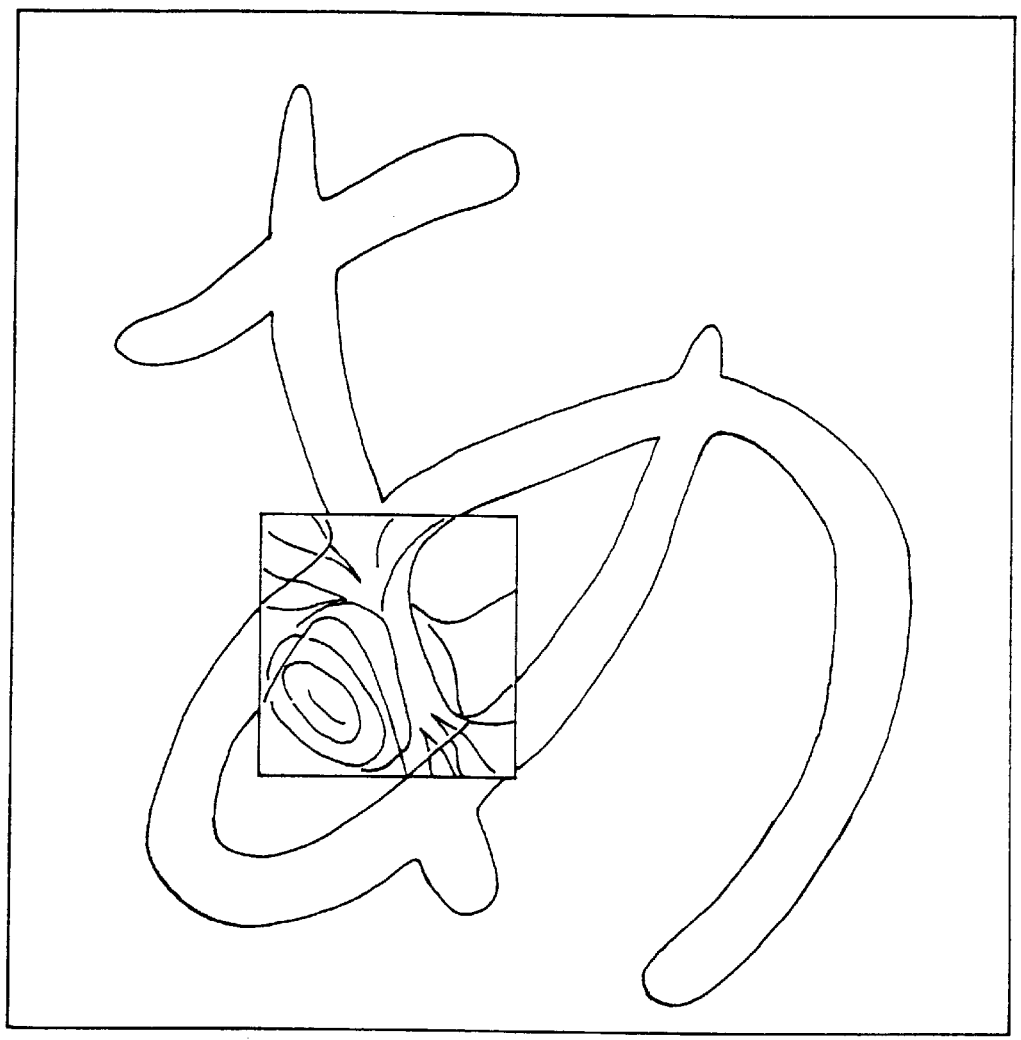
FIG. 32 is a view showing an updated area corresponding to a drawing operation in the processing procedure of FIG. 31, together with the original two-dimensional image.
Figure 33A:
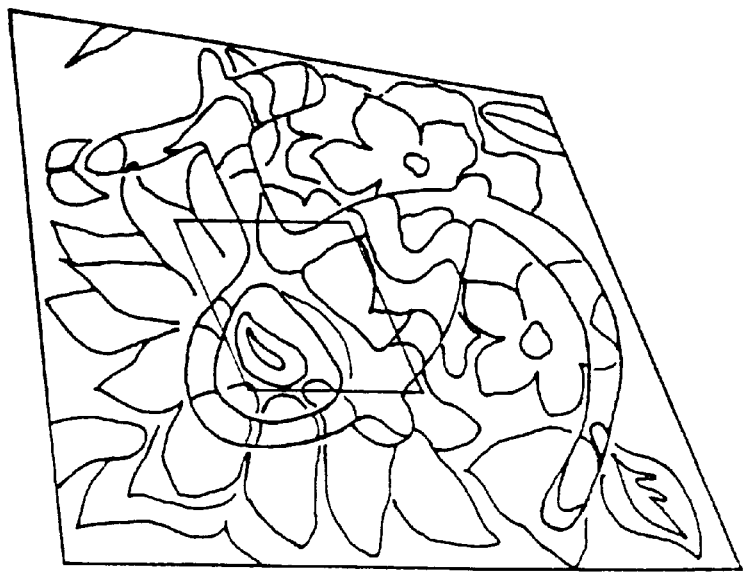
FIGS. 33A and 33B are respectively views showing a state in which image processing is carried out with respect to only updated area of FIG. 32.
Figure 33B:
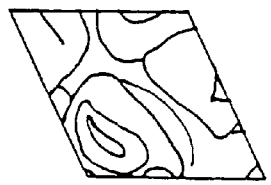

FIG. 31 shows a processing procedure according to still another embodiment of the invention. The processing procedure starts from step e1, and at step e2, a two-dimensional image is inputted. At step e3, an area block where a drawing operation is carried out when inputting the two-dimensional image is determined, and then, at step e4, only the area block determined at step e3 is used as a target for an update. Subsequently, at step e5, three-dimensional image processing after step c3 of FIG. 24 is carried out. At step e6, in a case where drawing is not completed, the sequence returns to step e2, and when it is completed, the processing procedure ends at step e7. More specifically, as shown in FIG. 32, when a part of the original two-dimensional image is changed by means of a drawing operation by using the brush tool, in the content of rendering, only a part on which a change is made is displayed as shown in FIG. 33A. Or as shown in FIG. 33B, other parts are erased, and only the changed part is displayed. In the above manner, a target range for update is limited, and thereby, it is possible to shorten a time taken until the image display as shown in FIG. 33A and FIG. 33B from the drawing image as shown in FIG. 32. Thus, a system excellent in response can be constructed.

In order to output a three-dimensional image having a high resolution from the output device 64 of FIG. 17, a massive image data processing needs to be carried out. For this reason, with software, partial image processing as shown in FIG. 31, or image processing only with respect to pixels which are displayed in the display unit 63 is carried out, and in the case of outputting an image to the output device 64, processing with respect to all pixels may be carried out. There is a need for confirming the three-dimensional image finally generated while seeing the image outputted from the output device 64. However, it is possible to confirm the intermediate stage of image processing by the image display of the display unit 63 with a low resolution. It is preferable in an operational response that the operation by the pointing device 54 and the image display by the display unit 63 are together carried out without time lag.

Moreover, the drawing process using the brush tool, the three-dimensional modeling process, and the rendering process, for example are divided into blocks to have a multi-processor configuration, whereby pipeline processing is simultaneously carried out. Thus, it is possible to carry out the whole image processing at a higher speed, and to improve the response.

When carrying out a drawing for modifying the three-dimensional image displayed on the display unit 63 by means of the pointing device 54, the result is incorporated into the original two-dimensional image, and then, the two-dimensional image can be modified. At this time, at step e2 of FIG. 31, modification of the three-dimensional image by drawing is carried out. Thereafter, the area block is set likewise at step e3, and at a step equivalent to step e4, the corresponding area block of the original two-dimensional image is updated. When the two-dimensional image is modified, the modified element information of the two-dimensional image is further incorporated into the three-dimensional model, and then, the three-dimensional image is modified. When the modification is directly performed on the final three-dimensional image, there is the possibility that a natural three-dimensional image is not always generated. However, when the modification is performed on the original two-dimensional image, it is possible to obtain a three-dimensional image having no mismatch of other parts. In this case, in order to rapidly relate a pixel on the three-dimensional image to a pixel of the original two-dimensional image, when transforming the element information extracted from the two-dimensional image into the three-dimensional information, reverse mapping information capable of mapping in the reverse direction is prepared together with mapping information from the two-dimensional image pixel to the three-dimensional image pixel. The reverse mapping information is stored as a reverse mapping address for each pixel by using a memory storing the three-dimensional image as reverse mapping means. By specifying a pixel of the three-dimensional image displayed on the display unit 63 by means of the pointing device 54, a reverse mapping address is read from the corresponding pixel, and then, the corresponding two-dimensional image pixel is rapidly specified, and thus, processing is carried out.

In the case of modifying the three-dimensional image obtained by rendering, there are two modifications depending upon the modifying direction, and a change-over of these modifications may be made as described in the first embodiment.

In this case, in the modification of the three-dimensional image, two kinds of pens are prepared, and these pens may be changed over for the aforesaid three-dimensional model modification and for the texture image modification. The pen is changed from that for the three-dimensional model modification to that for the texture image modification so as to modify the image data stored in the rendering memory of the three-dimensional image processing section 62. By doing so, it is possible to carry out a modification on the two-dimensional texture image data which is used for subjecting the surface of the three-dimensional image to texture mapping. Moreover, it is possible to modify the texture image while seeing the image data obtained by rendering, so that the modification of the image data is facilitated.

The three-dimensional image processing apparatus 51 as shown in FIG. 17 is constructed as dedicated hardware such that the brush shape setting section 57 and the three-dimensional image processing section 62 are operated independently from each other, and thereby, image processing is carried out at a high speed by pipeline processing. The CPU 55 may carry out the whole image processing according to preset programs. With such a construction, it is possible to operate the present apparatus as the three-dimensional image processing apparatus 1 by using a general work station and a personal computer, and by inserting a recording medium such as a CD-ROM with previously recorded programs thereon.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A three-dimensional image generating apparatus which subjects a three-dimensional model generated on the basis of a two-dimensional image to rendering so as to generate a three-dimensional image, said three-dimensional image generating apparatus comprising:

two-dimensional image storing means for storing image data which expresses the two-dimensional image;

three-dimensional model setting means for setting modeling data, as a basic shape of the three-dimensional model which has a surface to be deformed in a depth direction according to the two-dimensional image, which defines a three-dimensional shape which is a base for three-dimensionalizing the two-dimensional image;

three-dimensional model generating means for generating the three-dimensional model by deforming the basic shape of the three-dimensional model on the basis of the two-dimensional image stored in said two-dimensional image storing means according to a predetermined correspondence between an element directly from the two-dimensional image for which the three-dimensional model is to be generated that provides three-dimensional depth information and a three-dimensional deformation of the basic shape of the three-dimensional model, wherein said three-dimensional model generating means includes:

element extracting means for extracting information regarding a predetermined element as the element from the image data which expresses the two-dimensional image;

shape creating means for creating the three-dimensional shape by arbitrarily deforming the basic shape of the three dimensional model;

surface deforming means for deforming the surface of the three-dimensional shape of the three-dimensional model in the depth direction according to the information extracted by said element extracting means on the basis of the predetermined correspondence between the element of the two-dimensional image and the three-dimensional depth information; and rendering means for rendering the three-dimensional model into the three-dimensional image;

mapping means for preparing mapping information which expresses a correspondence between a pixel on the three-dimensional image and a pixel on the two-dimensional image represented by the image data stored in said two-dimensional image storing means;

a rendering memory operable to store three-dimensional data of the three-dimensional image produced by said rendering means together with the mapping information prepared by said mapping means;

three-dimensional image modifying means for modifying the three-dimensional image data stored in said rendering memory that is displayed as displayed data in response to a drawing operation for modifying the displayed data; and reverse mapping means for modifying the image data which expresses the two-dimensional image stored in said two-dimensional image storing means according to the mapping information stored in said rendering memory when the drawing operation is carried out.

2. The three-dimensional image generating apparatus of claim 1, wherein said element extracting means, said shape creating means, said surface deforming means and said rendering means process only image data within a predetermined area including a pixel to which the drawing operation for modifying the three-dimensional image data is carried out by said three-dimensional image modifying means.

3. The three-dimensional image generating apparatus of claim 1, wherein the element of the two-dimensional image that provides the three-dimensional depth information is one of gradation information and density information.

4. A three-dimensional image generating apparatus which subjects a three-dimensional model generated on the basis of a two-dimensional image to rendering so as to generate a three-dimensional image, said three-dimensional image generating apparatus comprising:

two-dimensional image storing means for storing a plurality of two-dimensional images, said two-dimensional image storing means having two-dimensional image drawing means provided with a brush tool for drawing a two-dimensional image, and the plurality of two-dimensional images including the two-dimensional image drawn by said two-dimensional image drawing means;

three-dimensional model setting means for setting modeling data, as a basic shape of the three-dimensional model which has a surface to be deformed in a depth direction according to the two-dimensional image, wherein said three-dimensional model setting means sets a relation between a shape of the three-dimensional model and predetermined element information of an element of the two-dimensional image;

three-dimensional model generating means for generating the three-dimensional model by deforming the basic shape of the three-dimensional model on the basis of the two-dimensional image stored in said two-dimensional image storing means according to a predetermined correspondence between the element directly from the two-dimensional image for which the three-dimensional model is to be generated that provides three-dimensional depth information and a three-dimensional deformation of the basic shape of the three-dimensional model, wherein said three-dimensional model generating means includes:

element extracting means for reading out the two-dimensional image stored in said two-dimensional image storing means, and extracting the predetermined element information related to the shape of the three-dimensional model from the two-dimensional image;

shape creating means for creating the three-dimensional shape by arbitrarily deforming the basic shape of the three dimensional model; and surface deforming means for deforming the surface of the three-dimensional shape of the three-dimensional model in the depth direction according to the information extracted by said element extracting means on the basis of the predetermined correspondence between the element of the two-dimensional image and the three-dimensional depth information;

image outputting means for outputting the three-dimensional image of the three-dimensional model deformed by said surface deforming means at a resolution higher than that of a displayed image of the three-dimensional image;

reverse mapping means for generating and storing a correspondence of a pixel of the displayed three-dimensional image to a pixel of the two-dimensional image from which the predetermined element information is extracted, as reverse mapping information, when deformation is performed on the three-dimensional model which reflects the predetermined element information of the two-dimensional image by said surface deforming means;

three-dimensional image modifying means for modifying the displayed three-dimensional image in accordance with a drawing operation on said two-dimensional image drawing means; and two-dimensional image modifying means for incorporating the modification made by said three-dimensional image modifying means into the two-dimensional image on the basis of the reverse mapping information stored in said reverse mapping means.

5. The three-dimensional image generating apparatus of claim 4, wherein the element of the two-dimensional image that provides the three-dimensional depth information is one of gradation information and density information.

6. A three-dimensional image generating apparatus which subjects a three-dimensional model generated on the basis of a two-dimensional image to rendering so as to generate a three-dimensional image, said three-dimensional image generating apparatus comprising:

two-dimensional image storing means for storing a plurality of two-dimensional images, said two-dimensional image storing means having two-dimensional image drawing means provided with a brush tool for drawing a two-dimensional image, and the plurality of two-dimensional images including the two-dimensional image drawn by said two-dimensional image drawing means;

three-dimensional model setting means for setting modeling data, as a basic shape of the three-dimensional model which has a surface to be deformed in a depth direction according to the two-dimensional image, wherein said three-dimensional model setting means sets a relation between a shape of the three-dimensional model and predetermined element information of an element of the two-dimensional image;

three-dimensional model generating means for generating the three-dimensional model by deforming the basic shape of the three-dimensional model on the basis of the two-dimensional image stored in said two-dimensional image storing means according to a predetermined correspondence between the element directly from the two-dimensional image for which the three-dimensional model is to be generated that provides three-dimensional depth information and a three-dimensional deformation of the basic shape of the three-dimensional model, wherein said three-dimensional model generating means includes:

element extracting means for reading out the two-dimensional image stored in said two-dimensional image storing means, and extracting the predetermined element information related to the shape of the three-dimensional model from the two-dimensional image;

shape creating means for creating the three-dimensional shape by arbitrarily deforming the basic shape of the three dimensional model; and surface deforming means for deforming the surface of the three-dimensional shape of the three-dimensional model in the depth direction according to the information extracted by said element extracting means on the basis of the predetermined correspondence between the element of the two-dimensional image and the three-dimensional depth information; and processing area limiting means for limiting said element extracting means and said surface deforming means so that when the two-dimensional image from which said element extracting means extracts the predetermined element information or a displayed three-dimensional image is modified via a drawing operation on said two-dimensional image drawing means, the processing of extracting the predetermined element information by said element extracting means and incorporating the predetermined element information into the three-dimensional model by said surface deforming means is effected in a limited predetermined shape area including a portion to be modified.

7. The three-dimensional image generating apparatus of claim 6, wherein said processing area limiting means limits said element extracting means, said shape creating means, and said surface deforming means so that the processing for incorporation into the three-dimensional model is effected with respect to a pixel in the two-dimensional image corresponding to a pixel on a displayed image of the three dimensional image within the limited predetermined shape area.

8. The three-dimensional image generating apparatus of claim 6, wherein the element of the two-dimensional image that provides the three-dimensional depth information is one of gradation information and density information.

9. A three-dimensional image generating apparatus which subjects a three-dimensional model generated on the basis of a two-dimensional image to rendering so as to generate a three-dimensional image, said three-dimensional image generating apparatus comprising:

two-dimensional image storing means for storing a plurality of two-dimensional images, said two-dimensional image storing means having two-dimensional image drawing means provided with a brush tool for drawing a two-dimensional image, and the plurality of two-dimensional images including the two-dimensional image drawn by said two-dimensional image drawing means;

three-dimensional model setting means for setting modeling data, as a basic shape of the three-dimensional model which has a surface to be deformed in a depth direction according to the two-dimensional image, wherein said three-dimensional model setting means sets a relation between a shape of the three-dimensional model and predetermined element information of an element of the two-dimensional image; and three-dimensional model generating means for generating the three-dimensional model by deforming the basic shape of the three-dimensional model on the basis of the two-dimensional image stored in said two-dimensional image storing means according to a predetermined correspondence between the element directly from the two-dimensional image for which the three-dimensional model is to be generated that provides three-dimensional depth information and a three-dimensional deformation of the basic shape of the three-dimensional model, wherein said three-dimensional model generating means includes:

element extracting means for reading out the two-dimensional image stored in said two-dimensional image storing means, and extracting the predetermined element information related to the shape of the three-dimensional model from the two-dimensional image;

shape creating means for creating the three-dimensional shape by arbitrarily deforming the basic shape of the three dimensional model; and surface deforming means for deforming the surface of the three-dimensional shape of the three-dimensional model in the depth direction according to the information extracted by said element extracting means on the basis of the predetermined correspondence between the element of the two-dimensional image and the three-dimensional depth information, wherein said two-dimensional image drawing means, said two-dimensional image storing means, said three dimensional model setting means, said element extracting means, said shape creating means, and said surface deforming means are divided into a plurality of processing blocks, said plurality of processing blocks performing pipeline processing.

10. The three-dimensional image generating apparatus of claim 9, wherein the element of the two-dimensional image that provides the three-dimensional depth information is one of gradation information and density information.

11. A three-dimensional image generating apparatus which subjects a three-dimensional model generated on the basis of a two-dimensional image to rendering so as to generate a three-dimensional image, said three-dimensional image generating apparatus comprising:

two-dimensional image storing means for storing a plurality of two-dimensional images, said two-dimensional image storing means having two-dimensional image drawing means provided with a brush tool for drawing a two-dimensional image, and the plurality of two-dimensional images including the two-dimensional image drawn by said two-dimensional image drawing means;

three-dimensional model setting means for setting modeling data, as a basic shape of the three-dimensional model which has a surface to be deformed in a depth direction according to the two-dimensional image, wherein said three-dimensional model setting means sets a relation between a shape of the three-dimensional model and predetermined element information of an element of the two-dimensional image; and three-dimensional model generating means for generating the three-dimensional model by deforming the basic shape of the three-dimensional model on the basis of the two-dimensional image stored in said two-dimensional image storing means according to a predetermined correspondence between the element directly from the two-dimensional image for which the three-dimensional model is to be generated that provides three-dimensional depth information and a three-dimensional deformation of the basic shape of the three-dimensional model, wherein said three-dimensional model generating means includes:

element extracting means for reading out the two-dimensional image stored in said two-dimensional image storing means, and extracting the predetermined element information related to the shape of the three-dimensional model from the two-dimensional image;

shape creating means for creating the three-dimensional shape by arbitrarily deforming the basic shape of the three dimensional model; and surface deforming means for deforming the surface of the three-dimensional shape of the three-dimensional model in the depth direction according to the information extracted by said element extracting means on the basis of the predetermined correspondence between the element of the two-dimensional image and the three-dimensional depth information, wherein said two-dimensional image drawing means is provided with a pointing device capable of inputting two-dimensional coordinates and information regarding pen pressure for operating said brush tool.

12. The three-dimensional image generating apparatus of claim 11, wherein the element of the two-dimensional image that provides the three-dimensional depth information is one of gradation information and density information.

13. A three-dimensional image generating apparatus which subjects a three-dimensional model generated on the basis of a two-dimensional image to rendering so as to generate a three-dimensional image, said three-dimensional image generating apparatus comprising:

two-dimensional image storing means for storing a plurality of two-dimensional images, said two-dimensional image storing means having two-dimensional image drawing means provided with a brush tool for drawing a two-dimensional image, and the plurality of two-dimensional images including the two-dimensional image drawn by said two-dimensional image drawing means;

three-dimensional model setting means for setting modeling data, as a basic shape of the three-dimensional model which has a surface to be deformed in a depth direction according to the two-dimensional image, wherein said three-dimensional model setting means sets a relation between a shape of the three-dimensional model and predetermined element information of an element of the two-dimensional image; and three-dimensional model generating means for generating the three-dimensional model by deforming the basic shape of the three-dimensional model on the basis of the two-dimensional image stored in said two-dimensional image storing means according to a predetermined correspondence between the element directly from the two-dimensional image for which the three-dimensional model is to be generated that provides three-dimensional depth information and a three-dimensional deformation of the basic shape of the three-dimensional model, wherein said three-dimensional model generating means includes:

element extracting means for reading out the two-dimensional image stored in said two-dimensional image storing means, and extracting the predetermined element information related to the shape of the three-dimensional model from the two-dimensional image;

shape creating means for creating the three-dimensional shape by arbitrarily deforming the basic shape of the three dimensional model; and surface deforming means for deforming the surface of the three-dimensional shape of the three-dimensional model in the depth direction according to the information extracted by said element extracting means on the basis of the predetermined correspondence between the element of the two-dimensional image and the three-dimensional depth information, wherein said surface deforming means erases portions where the predetermined element information of the two-dimensional image is not incorporated into the shape of the three-dimensional model to be created, while leaving other portions which reflect the two-dimensional image.

14. The three-dimensional image generating apparatus of claim 13, wherein said surface deforming means incorporates the predetermined element information of the two-dimensional image into the shape of the three-dimensional model in both of retracting and protruding directions of the three-dimensional model in incorporating the predetermined element information into the three-dimensional model.

15. The three-dimensional image generating apparatus of claim 13, wherein the element of the two-dimensional image that provides the three-dimensional depth information is one of gradation information and density information.

16. A three-dimensional image generating apparatus which subjects a three-dimensional model generated on the basis of a two-dimensional image to rendering so as to generate a three-dimensional image, said three-dimensional image generating apparatus comprising:

two-dimensional image storing means for storing image data which expresses the two-dimensional image;

three-dimensional model setting means for setting modeling data, as a basic shape of the three-dimensional model which has a surface to be deformed in a depth direction according to the two-dimensional image, which defines a three-dimensional shape which is a base for three-dimensionalizing the two-dimensional image;

three-dimensional model generating means for generating the three-dimensional model by deforming the basic shape of the three-dimensional model on the basis of the two-dimensional image stored in said two-dimensional image storing means according to a predetermined correspondence between an element directly from the two-dimensional image for which the three-dimensional model is to be generated that provides three-dimensional depth information and a three-dimensional deformation of the basic shape of the three-dimensional model, wherein said three-dimensional model generating means includes:

element extracting means for extracting information regarding a predetermined element as the element from the image data which expresses the two-dimensional image;

shape creating means for creating the three-dimensional shape by arbitrarily deforming the basic shape of the three dimensional model;

surface deforming means for deforming the surface of the three-dimensional shape of the three-dimensional model in the depth direction according to the information extracted by said element extracting means on the basis of the predetermined correspondence between the element of the two-dimensional image and the three-dimensional depth information; and rendering means for rendering the three-dimensional model into the three-dimensional image; and two-dimensional image modifying means for modifying the image data which expresses the two-dimensional image stored in said two-dimensional image storing means in response to a drawing operation being performed on the two-dimensional image, wherein said element extracting means, said shape creating means, said surface deforming means and said rendering means process only image data within a predetermined area including a pixel to which the drawing operation for modifying the three-dimensional image data is carried out by said two-dimensional image modifying means.

17. The three-dimensional image generating apparatus of claim 16, wherein the element of the two-dimensional image that provides the three-dimensional depth information is one of gradation information and density information.

* * * * *